United States Patent
Kuno

(10) Patent No.: US 9,538,042 B2
(45) Date of Patent: Jan. 3, 2017

(54) IMAGE PROCESSING DEVICE CALIBRATING VALUE RELATED TO HALFTONE PROCESS FOR DETERMINING DOT FORMATION STATE

(71) Applicant: BROTHER KOGYO KABUSHIKI KAISHA, Nagoya-shi, Aichi-ken (JP)

(72) Inventor: Masashi Kuno, Obu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/012,657

(22) Filed: Aug. 28, 2013

(65) Prior Publication Data

US 2014/0071497 A1    Mar. 13, 2014

(30) Foreign Application Priority Data

Sep. 7, 2012  (JP) ................. 2012-197940

(51) Int. Cl.
*H04N 1/405*  (2006.01)
*H04N 1/60*  (2006.01)

(52) U.S. Cl.
CPC .......... *H04N 1/40018* (2013.01); *H04N 1/405* (2013.01); *H04N 1/6033* (2013.01); *H04N 1/6091* (2013.01)

(58) Field of Classification Search
USPC .... 358/3.06, 3.26, 3.27, 518, 521, 534–536; 347/131
See application file for complete search history.

(56) References Cited

U.S. PATENT DOCUMENTS

| 5,764,387 | A | * | 6/1998 | Yamada | H04N 1/6025 358/518 |
| 5,809,213 | A | | 9/1998 | Bhattacharjya | |
| 5,838,465 | A | * | 11/1998 | Satou | H04N 1/6033 358/504 |
| 6,804,025 | B1 | * | 10/2004 | Ueda et al. | 358/1.9 |
| 6,999,199 | B2 | * | 2/2006 | Degani et al. | 358/1.9 |

(Continued)

FOREIGN PATENT DOCUMENTS

JP    10-148978 A    6/1998
JP    2005-212171 A    8/2005

(Continued)

OTHER PUBLICATIONS

Office Action issued in related Japanese patent application No. 2012-197940, mailed Apr. 19, 2016.

(Continued)

*Primary Examiner* — Barbara Reinier
(74) *Attorney, Agent, or Firm* — Merchant & Gould P.C.

(57) ABSTRACT

An image processing device includes a processor and a memory. The memory stores computer-readable instructions therein. The computer-readable instructions, when executed by the processor, cause the image processing device to perform: acquiring a calibration value based on a plurality of test images that are printed on a recording medium, the calibration value indicating an amount of calibration; calibrating a target value by using the calibration value, the target value being used to determine a dot formation state of each pixel of an image in a halftone process; and generating print data by performing the halftone process on each pixel based on the calibrated target value.

21 Claims, 13 Drawing Sheets

| OFFSET AMOUNT Vbb | CALIBRATION VALUE (CONTROL VALUE) BLACK Ck | OFFSET AMOUNT Vgb | CALIBRATION VALUE (CONTROL VALUE) | | |
|---|---|---|---|---|---|
| | | | CYAN Cc | MAGENTA Cm | YELLOW Cy |
| −5 | 0.875 | −5 | 0.9 | 0.9 | 0.9 |
| −4 | 0.9 | −4 | 0.92 | 0.92 | 0.92 |
| −3 | 0.925 | −3 | 0.94 | 0.94 | 0.94 |
| −2 | 0.95 | −2 | 0.96 | 0.96 | 0.96 |
| −1 | 0.975 | −1 | 0.98 | 0.98 | 0.98 |
| 0 | 1 | 0 | 1 | 1 | 1 |
| 1 | 1.037 | 1 | 1.025 | 1.025 | 1.025 |
| 2 | 1.075 | 2 | 1.05 | 1.05 | 1.05 |
| 3 | 1.112 | 3 | 1.075 | 1.075 | 1.075 |
| 4 | 1.15 | 4 | 1.1 | 1.1 | 1.1 |
| 5 | 1.187 | 5 | 1.125 | 1.125 | 1.125 |

(56) References Cited

U.S. PATENT DOCUMENTS

| | | |
|---|---|---|
| 8,767,277 B2 * | 7/2014 | Uroz Soria .................. 358/504 |
| 2005/0190216 A1 | 9/2005 | Yamazaki et al. |
| 2006/0256408 A1 * | 11/2006 | Yoshida .............. H04N 1/6033 358/518 |
| 2007/0121179 A1 | 5/2007 | Yoshida et al. |
| 2008/0094436 A1 * | 4/2008 | Kakutani et al. ............... 347/15 |
| 2010/0290091 A1 * | 11/2010 | Klassen ........................ 358/406 |
| 2011/0164285 A1 * | 7/2011 | Itagaki ........................ 358/3.06 |
| 2012/0062651 A1 * | 3/2012 | Takahashi et al. ............. 347/43 |
| 2014/0071504 A1 | 3/2014 | Kuno |

FOREIGN PATENT DOCUMENTS

| | | |
|---|---|---|
| JP | 2005-297489 A | 10/2005 |
| JP | 2007-144885 A | 6/2007 |
| JP | 2007-266842 A | 10/2007 |
| JP | 2008-066923 A | 3/2008 |
| JP | 2012-29061 A | 2/2012 |

OTHER PUBLICATIONS

Office Action issued in related JP application No. 2012-197941, mailed Dec. 15, 2015.

* cited by examiner

| | m-S 20% | m-M 20% | m-L 20% | m-S 30% | m-M 30% | m-L 30% | OFFSET AMOUNT Vg | | | k-S 20% | k-M 20% | k-L 20% | k-S 30% | k-M 30% | k-L 30% | OFFSET AMOUNT Vb |
|---|---|---|---|---|---|---|---|---|---|---|---|---|---|---|---|---|
| | | | | | | | | | | | | | | | | −5 |
| | | | | | | | | | | | | | | | | −4 |
| Sm | 140 | 131 | 115 | 108 | 99 | 88 | −5 | Vgm | | | | | | | | −3 |
| | 142 | 132 | 117 | 110 | 101 | 91 | −4 | | | | | | | | | −2 |
| | 144 | 133 | 119 | 112 | 103 | 93 | −3 | | | | | | | | | −1 |
| | 146 | 134 | 121 | 114 | 105 | 96 | −2 | | | | | | | | | 0 |
| | 147 | 135 | 123 | 115 | 106 | 98 | −1 | | | | | | | | | +1 |
| S0 | 148 | 137 | 125 | 116 | 107 | 100 | 0 | Vg0 | | | | | | | | +2 |
| | 149 | 139 | 126 | 118 | 108 | 101 | +1 | | | | | | | | | +3 |
| | 151 | 141 | 127 | 120 | 110 | 103 | +2 | | | | | | | | | +4 |
| | 153 | 143 | 129 | 122 | 112 | 105 | +3 | | | | | | | | | +5 |
| | 155 | 145 | 132 | 125 | 115 | 108 | +4 | | | | | | | | | |
| Sp | 157 | 147 | 134 | 127 | 117 | 110 | +5 | Vgp | | | | | | | | |

| OFFSET AMOUNT Vbb | CALIBRATION VALUE (CONTROL VALUE) BLACK Ck | OFFSET AMOUNT Vgb | CALIBRATION VALUE (CONTROL VALUE) | | |
|---|---|---|---|---|---|
| | | | CYAN Cc | MAGENTA Cm | YELLOW Cy |
| −5 | 0.875 | −5 | 0.9 | 0.9 | 0.9 |
| −4 | 0.9 | −4 | 0.92 | 0.92 | 0.92 |
| −3 | 0.925 | −3 | 0.94 | 0.94 | 0.94 |
| −2 | 0.95 | −2 | 0.96 | 0.96 | 0.96 |
| −1 | 0.975 | −1 | 0.98 | 0.98 | 0.98 |
| 0 | 1 | 0 | 1 | 1 | 1 |
| 1 | 1.037 | 1 | 1.025 | 1.025 | 1.025 |
| 2 | 1.075 | 2 | 1.05 | 1.05 | 1.05 |
| 3 | 1.112 | 3 | 1.075 | 1.075 | 1.075 |
| 4 | 1.15 | 4 | 1.1 | 1.1 | 1.1 |
| 5 | 1.187 | 5 | 1.125 | 1.125 | 1.125 |

136k  136c  136m  136y

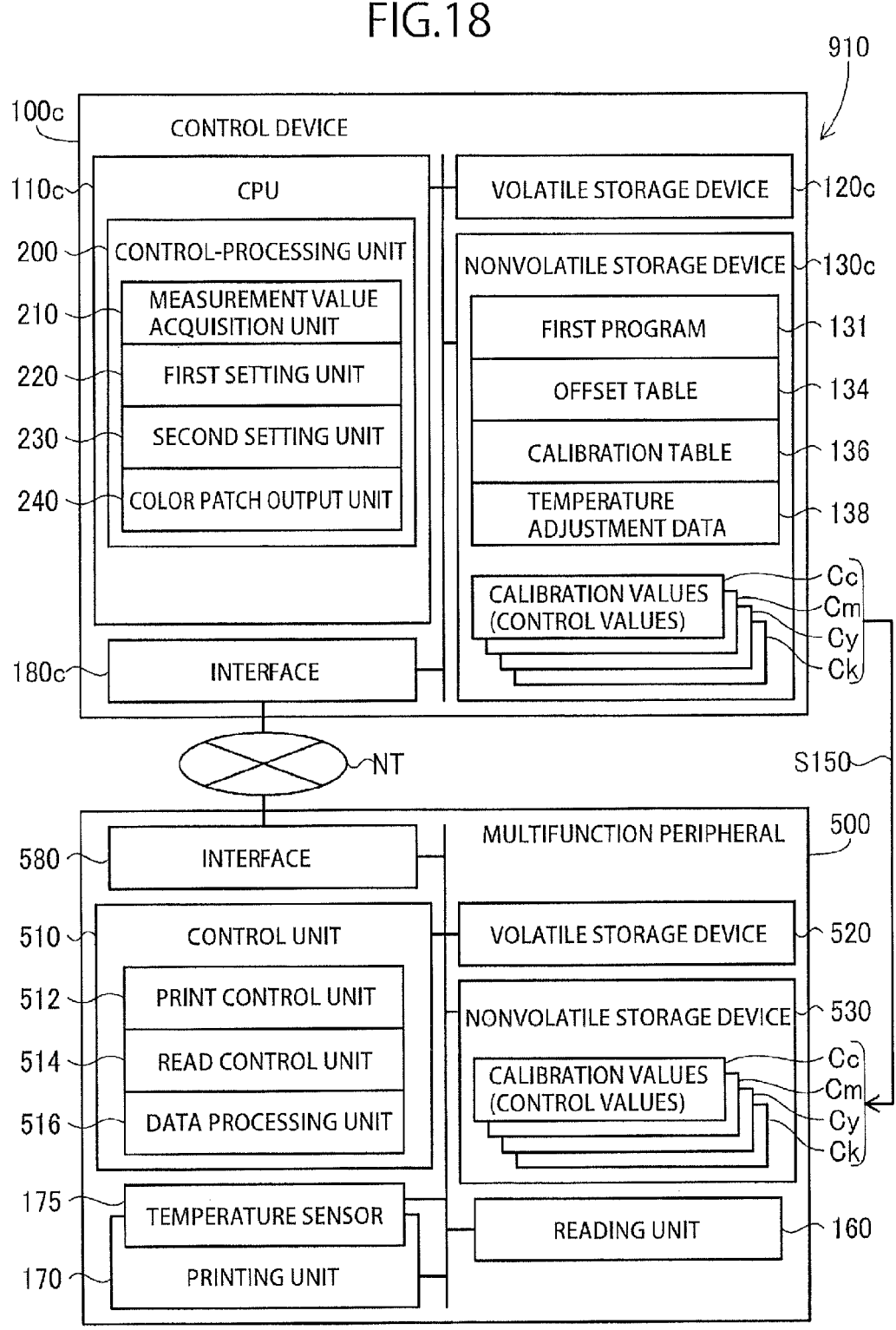

IMAGE PROCESSING DEVICE CALIBRATING VALUE RELATED TO HALFTONE PROCESS FOR DETERMINING DOT FORMATION STATE

CROSS REFERENCE TO RELATED APPLICATION

This application claims priority from Japanese Patent Application No. 2012-197940 filed Sep. 7, 2012. The entire content of the priority application is incorporated herein by reference. The present application is closely related to a co-pending U.S. Patent Application (corresponding to Japanese Patent Application No. 2012-197941 filed on Sep. 7, 2012).

TECHNICAL FIELD

The present invention relates to an image processing device.

BACKGROUND

Conventionally, printing devices have used ink toner and other colorants to print images. Various other technologies have also been proposed for improving the quality of the printed images. One proposed technology for adjusting ink amounts in the CMYK colors, which are the output values of a color conversion lookup table, involves printing color patches with the printing device and using the colorimetric values of these patches for calibration.

SUMMARY

However, this technique cannot achieve suitable control over the printed results, such as the printed colors and the quantities of colorant ejected. The present invention provides a technology capable of suitably controlling the printed results.

In view of the foregoing, it is an object of the present invention to provide a technology for resolving at least partially the shortcomings in the prior art described above.

In order to attain the above and other objects, the invention provides an image processing device including a processor and a memory. The memory stores computer-readable instructions therein. The computer-readable instructions, when executed by the processor, cause the image processing device to perform: acquiring a calibration value based on a plurality of test images that are printed on a recording medium, the calibration value indicating an amount of calibration; calibrating a target value by using the calibration value, the target value being used to determine a dot formation state of each pixel of an image in a halftone process; and generating print data by performing the halftone process on each pixel using the calibrated target value.

According to another aspect, the present invention provides an image processing device including a processor and a memory. The memory stores computer-readable instructions therein. The computer-readable instructions, when executed by the processor, causes the image processing device to perform: acquiring a calibration value based on a plurality of test images that are printed on a recording medium, the calibration value indicating an amount of calibration; calibrating a target value by using the calibration value, the target value being a parameter used to perform a color conversion on image data; performing the color conversion on the image data by using the calibrated target value; and generating print data by performing a halftone process on the converted image data through the color conversion.

According to another aspect, the present invention provides a non-transitory computer readable storage medium storing a set of program instructions installed on and executed by a computer, the program instructions comprising: acquiring a calibration value based on a plurality of test images that are printed on a recording medium, the calibration value indicating an amount of calibration; calibrating a target value by using the calibration value, the target value being used to determine a dot formation state of each pixel of an image in a halftone process; and generating print data by performing the halftone process on each pixel using the calibrated target value.

BRIEF DESCRIPTION OF THE DRAWINGS

The particular features and advantages of the invention as well as other objects will become apparent from the following description taken in connection with the accompanying drawings, in which:

FIG. 6 shows an example of a calibration table stored in the image processing device according to the first embodiment;

FIG. 18 is a block diagram of an image-processing system according to a fifth embodiment of the present invention.

DETAILED DESCRIPTION

A. First Embodiment

A1. Structure of a Multifunction Peripheral

Figure 1:
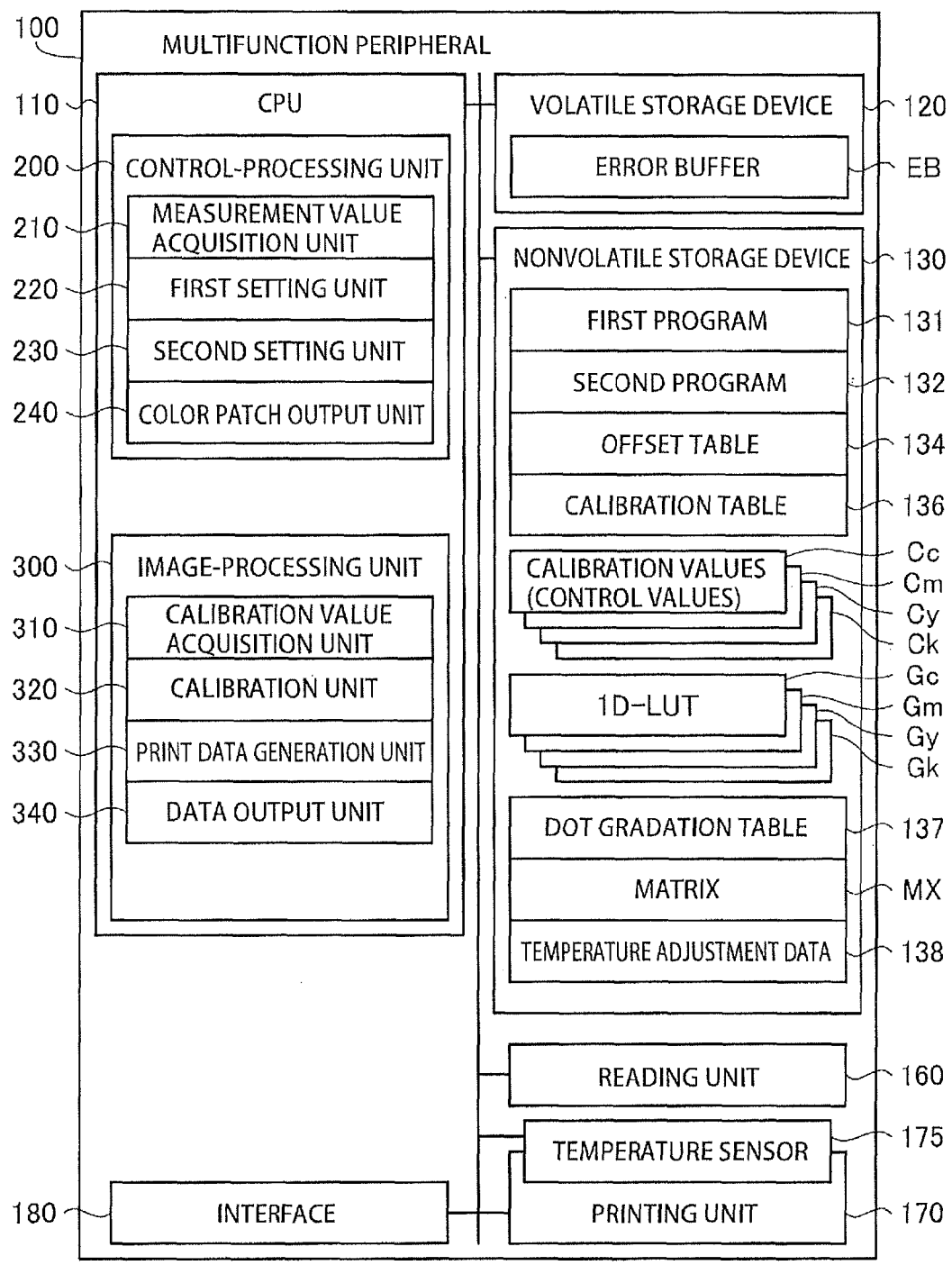
FIG. 1 is a block diagram showing the structure of an image processing device (control device) according to a first embodiment of the present invention.

FIG. 1 is a block diagram showing the structure of a multifunction peripheral 100 according to a first embodiment of the present invention. The multifunction peripheral 100 includes a CPU 110 for performing overall control of the multifunction peripheral 100, a volatile storage device 120 such as DRAM, a nonvolatile storage device 130 such as flash memory, a reading unit 160, a printing unit 170, a temperature sensor 175, and an interface 180 for communicating with other devices (a network interface or USB interface, for example).

The reading unit 160 is a scanner equipped with an optical sensor, such as a contact image sensor (CIS; not shown). The reading unit 160 optically reads an object, such as printed material, and generates image data representing the object that is read (hereinafter referred to as "scan data").

The printing unit 170 is an inkjet printer that prints by ejecting ink droplets through nozzles formed in a print head (not shown). A plurality of nozzles is formed in the print head for each ink color. In the first embodiment, the printing unit 170 prints images with four colors of ink (colorant): cyan, magenta, yellow, and black. Here, dye-based ink is used for the three colors cyan, magenta, and yellow, while a pigment ink is used for black. Although the components of the colorant composing the cyan, magenta, and yellow inks differ, the colorant is the same type (dye-based) for each color. However, the three dye-based inks (cyan, magenta, and yellow) differ from the black ink in both colorant composition and type. The temperature sensor 175 is fixed to the print head of the printing unit 170, for example, and functions to measure the temperature in the printing unit 170.

The nonvolatile storage device 130 serves to store a first program 131; a second program 132; an offset table 134; a calibration table 136; calibration values Cc, Cm, Cy, and Ck (also referred to as control values); density conversion mappings Gc, Gm, Gy, and Gk; a dot gradation table 137, a matrix MX; and temperature adjustment data 138. Here, the lower case letters c, m, y, and k included in the reference numerals for the calibration values Cc, Cm, Cy, and Ck and the mappings Gc, Gm, Gy, and Gk indicate the corresponding color of ink (cyan, magenta, yellow, and black). Therefore, the calibration values Cc, Cm, Cy, and Ck represent calibration values for the corresponding ink colors cyan, magenta, yellow, and black, respectively, while the mappings Gc, Gm, Gy, and Gk represent the corresponding density conversion mappings for the four ink colors cyan, magenta, yellow, and black, respectively. The calibration values Cc, Cm, Cy, and Ck are generated in a process described later, while the remaining data described above is pre-stored in the nonvolatile storage device 130 (in the factory prior to shipping the multifunction peripheral 100, for example). Each of calibration values Cc, Cm, Cy, and Ck indicates an amount of calibration.

The volatile storage device 120 includes an error buffer EB that serves to store error values in a halftone process described later.

The CPU 110 executes the first program 131 and second program 132 stored in the nonvolatile storage device 130 and functions as a control-processing unit 200 when executing the first program 131 and as an image-processing unit 300 when executing the second program 132. The control-processing unit 200 sets the calibration values Cc, Cm, Cy, and Ck for calibrating the amounts of ink to be ejected during printing (hereinafter referred to as "ink ejection amounts"). The image-processing unit 300 generates print data for printing images using the calibration values Cc, Cm, Cy, and Ck. As shown in FIG. 1, the control-processing unit 200 includes a measurement value acquisition unit 210, a first setting unit 220, a second setting unit 230, and a color patch output unit 240. The image-processing unit 300 includes a calibration value acquisition unit 310, a calibration unit 320, a print data generation unit 330, and a data output unit 340. The functions of these process units will be described later.

A2. Determination of Calibration Values (Control Values)

Figure 2:
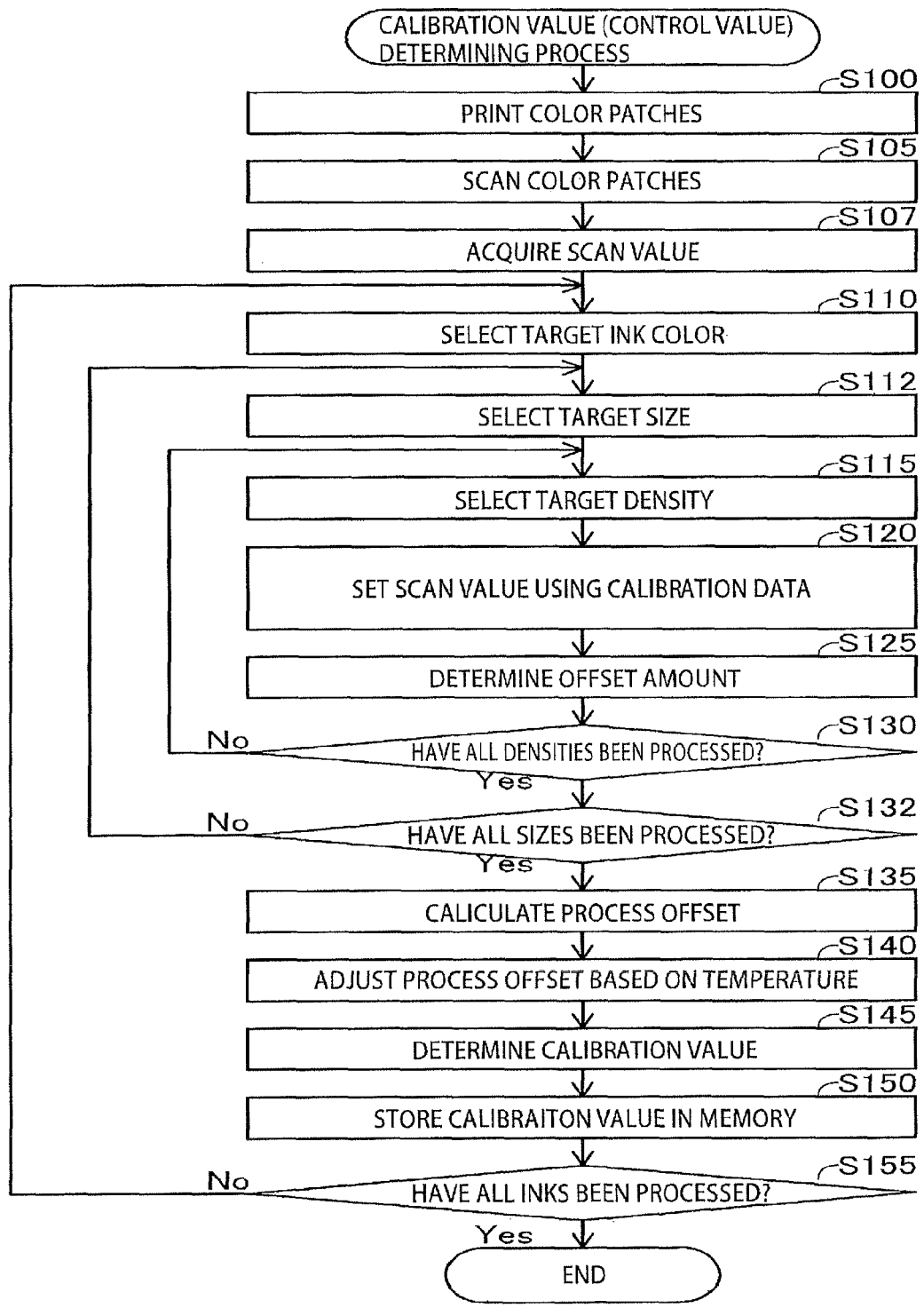
FIG. 2 is a flowchart illustrating steps in a calibration value determining process executed by the image processing device according to the first embodiment.
Figure 3:
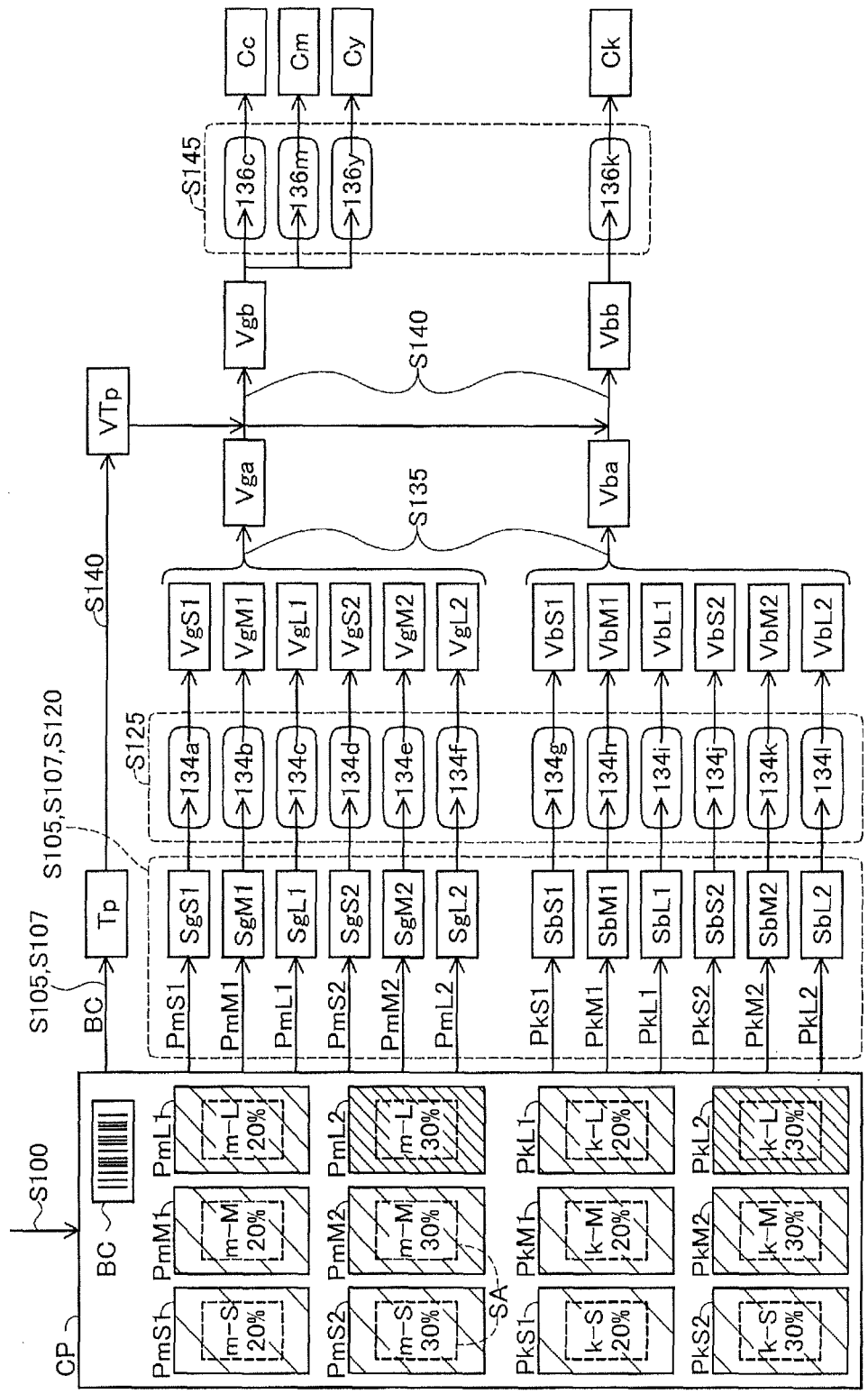
FIG. 3 is an explanatory diagram illustrating the calibration value determining process in the first embodiment.

FIG. 2 is a flowchart illustrating steps in the calibration value determining process for setting the calibration values Cc, Cm, Cy, and Ck. FIG. 3 is an explanatory diagram illustrating the calibration value determining process. The control-processing unit 200 begins the process of FIG. 2 in response to a user command. The user inputs the command into the multifunction peripheral 100 through an operating unit configured of buttons or a touch panel (not shown), for example.

In S100 at the beginning of the process in FIG. 2, the control-processing unit 200 performs a process to print a color patch set. FIG. 3 shows an example of a color patch set CP printed in S100. The color patch set CP includes a barcode BC, and twelve patches PmS1, PmM1, PmL1, PmS2, PmM2, PmL2, PkS1, PkM1, PkL1, PkS2, PkM2, and PkL2. The barcode BC specifies various information, including the temperature of the printing unit 170 while printing the color patch set CP. Each patch of the color patch set CP is printed using a single ink color, and the density of the ink is uniform within each patch.

More specifically, the color patch printing process includes the following steps. First, the color patch output unit 240 (see FIG. 1) acquires temperature data from the temperature sensor 175 and generates image data for a barcode BC representing the acquired temperature. Next, the color patch output unit 240 generates print data representing the color patch set CP using the image data generated for the barcode BC and prescribed image data representing the twelve patches. The color patch output unit 240 then outputs the print data to the printing unit 170, and the printing unit 170 prints the color patch set CP based on the print data received from the color patch output unit 240. The temperature represented by the barcode BC can be used as the temperature of the printing unit 170 when the color patch set CP is printed since the temperature generally does not change significantly between the moment the temperature data is acquired and the moment the color patch set CP is printed.

The twelve patches shown in FIG. 3 correspond to twelve different combinations of ink type, ink ejection amount, and dot size. The ink type is one of magenta ink (m) and black ink (k). The ink ejection amount is one of 20% and 30%. Here, the ink ejection amount is represented by a dot recording rate, where a recording rate of 100% indicates that the recorded dot covers the entire pixel. The dot recording rate indicates a ratio of a pixel number of pixels on which a dot is to be recorded to a total number of pixels contained in a prescribed area. Dot recording rates are one type of parameter expressing density. Hence, the ink ejection amount can be used to express density. Finally, the dot size is one of large (L), medium (M), and small (S).

The composition of the twelve patches can be identified by the characters appended to the symbol "P" representing "patch."

1) Ink type: m=magenta ink, k=black ink
2) Dot size: S=small dot, M=medium dot, L=large dot
3) Ink ejection amount: 1=20%, 2=30%

The twelve patches are printed at predetermined positions on the printing medium.

The dot size is related to the quantity of ink in a single dot recorded on the printing medium (hereinafter, the ink quantity for a single dot will be called the "dot ink quantity"). The printing unit 170 is configured to produce large, medium, and small dot sizes (dot ink quantities) at predetermined large, medium, and small reference dot sizes (reference dot ink quantities). Print data represents dot patterns (dot formation states) that have been set to produce dot sizes equivalent to the reference dot sizes. That is, the print data specifies ink ejection amounts (ink ejection amounts per unit area) based on the reference dot sizes. Hereinafter, an ink ejection amount based on a reference dot size will be called a "reference ink ejection amount."

The actual dot ink quantity may differ from the reference dot ink quantity due to manufacturing error in various members, such as the ink channels (not shown) connecting ink tanks to the print head and the power supply (not shown) that drives the print head. Since the actual dot ink quantity may differ from the reference dot ink quantity, the actual ink ejection amount per unit area may also differ from the reference ink ejection amount specified by the print data. As will be described later, the calibration values Cc, Cm, Cy, and Ck can reduce such individual differences.

In S105 of FIG. 2, the measurement value acquisition unit 210 (see FIG. 1) controls the reading unit 160 to scan the printed color patch set CP. Specifically, the user sets the printing medium on which the color patch set CP was printed in the reading unit 160 and inputs a command to scan the printing medium. In response to the user's command, the measurement value acquisition unit 210 initiates the scan with the reading unit 160. The reading unit 160 optically reads the color patch set CP printed on the printing medium, including the barcode BC and the twelve patches, and generates scan data. The scan data represents the colors for each of a plurality of pixels arranged in a matrix configuration. In the first embodiment, the color of each pixel is expressed by color values for red (R), green (G), and blue (B) (values for a possible 256 levels, for example). In S107 the measurement value acquisition unit 210 acquires the scan data from the reading unit 160.

In S110 the measurement value acquisition unit 210 selects one of the ink colors used to print the plurality of patches (magenta and black in this example) that has not yet undergone the processes in S145 and S150 described below for setting calibration values and for storing these values in the nonvolatile storage device 130. The unprocessed ink color selected in S110 will be called the "target ink color" in the process described below.

In S112 the measurement value acquisition unit 210 selects one of the plurality of dot sizes (large, medium, and small in this example) of the patches printed using the target ink color selected in S110 that has not yet undergone the process in S125 described below for setting an offset. This unprocessed size selected in S112 will be called the "target size" in the following description.

In S115 the measurement value acquisition unit 210 selects one of the plurality of ink ejection amounts (or "densities"; 20% and 30% in this example) of the patches printed using the target ink selected in S110 with the target size selected in S112 that has not yet undergone the process in S125 described later for setting an offset. The unprocessed ink ejection amount selected in S115 will be called the "target density" in the following description.

In the following description, the patch corresponding to the combination of target ink color, target size, and target density selected in S110, S112, and S115 described above will be called the "target patch."

In S120 the measurement value acquisition unit 210 uses calibration data (described below) to set a value representing the optical reading results for the target patch (hereinafter called the "scan value"), First, the measurement value acquisition unit 210 selects a plurality of pixels representing the target patch from among the pixels constituting the scan data. The selected pixels fall within a selection area SA (see FIG. 3) preset for each patch. The selection area SA covers an internal portion of the patch while excluding the edge portions. The selection area SA is preferably larger than the area covered by the plurality of nozzles used to print the patch (the area of the print head), thereby reducing the possibility of variations in ink ejection amounts among nozzles from affecting the scan value.

Next, the measurement value acquisition unit 210 calculates the average of a specific color value (hereinafter called the "process color value") for the selected pixels. In the first embodiment, the process color value is the value of a complementary color to the target ink color. For example, the green color value is used when the target ink color is magenta. Any color value may be used when the target ink color is black (the blue value is used in the first embodiment).

Next, the measurement value acquisition unit 210 sets the scan value by calibrating the average value calculated above using calibration data. The calibration data defines correlations between pre-calibrated values and post-calibrated values and is predetermined based on the characteristics of the reading unit 160. Note that calibration performed using this calibration data may be omitted for at least some of the process color values. Further, the single value acquired based on the process color value for the plurality of pixels in the selection area SA is not limited to an average value but may be any of various values represented by a function of the process color values for these pixels (a statistical quantity such as the average, mode, median, maximum, or minimum).

FIG. 3 shows twelve scan values SgS1, SgM1, SgL1, SgS2, SgM2, SgL2, SbS1, SbM1, SbL1, SbS2, SbM2, and SbL2 associated with the twelve patches. The correlations between the twelve scan values and twelve patches can be identified from characters appended to the letter "S" representing "scan value."

1) Color component: g=green (magenta patch), b=blue (black patch)
2) Dot size: S=small dot, M=medium dot, L=large dot
3) Ink ejection amount: 1=20%, 2=30%

The scan value may also be called an optical measurement value since the value is obtained by optically reading the patch.

Figures 4, 5:
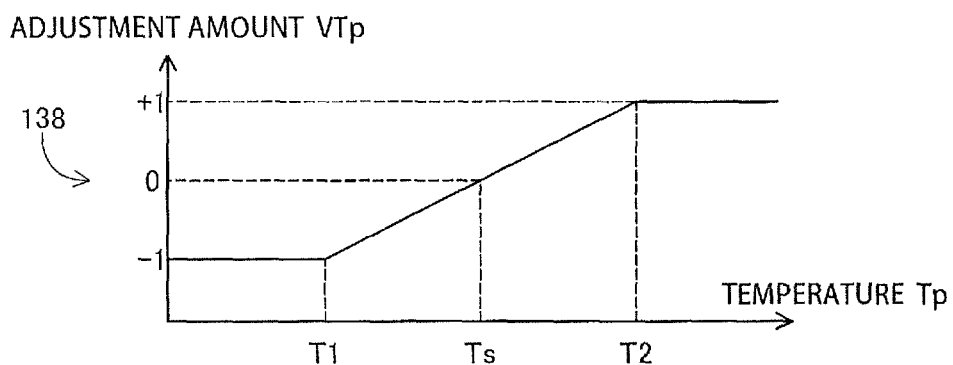
FIG. 4 shows an example of an offset table stored in the image processing device according to the first embodiment.
FIG. 5 is a graph showing relationship between temperatures and adjustment amount in the first embodiment.

In S125 of FIG. 2 the first setting unit 220 (see FIG. 1) looks up the scan value in the offset table 134 to determine an offset amount. FIG. 4 shows an example of the offset table 134. The offset table 134 defines correlations between scan values and offsets. In the first embodiment, the offset table 134 defines twelve correlations 134a-134l corresponding to the twelve patches. FIG. 4 shows details of the six correlations 134a-134f associated with magenta patches while omitting details of the six correlations 134g-134l associated with black patches. Next, relationships between predetermined scan values and predetermined offsets will be described with reference to the correlations 134a-134f for magenta.

The top row of the section in FIG. 4 having columns indicated by the reference numerals 134a-134f shows data identifying the patches. Here, the character "m" denotes magenta ink; characters "S", "M", and "L" denote the dot sizes small, medium, and large, respectively; and percentages "20%" and "30%" denote the ink ejection amounts. In the example of FIG. 4, a correlation for a single patch comprises eleven pairs of predetermined scan values and predetermined offsets. The numbers in columns assigned reference numerals 134a-134f indicate the predetermined scan values, while numbers in the column assigned reference numeral Vg indicate the predetermined offsets Vg. The predetermined eleven offsets Vg in the example of FIG. 4 are integers ranging from −5 to +5. Each offset Vg is associated with a scan value in the same row for each of the correlations 134a-134f. The offset for undefined scan values is determined through interpolation and includes a decimal component. If the scan value is greater than the largest of the eleven scan values, the offset corresponding to the largest scan value is used (+5 in this example). If the scan value is less than the smallest of the scan values, then the offset corresponding to the smallest scan value is used (−5 in this example).

A zero offset Vg0 indicates that there is no difference between the scan value and a predetermined reference value. In other words, the scan value corresponding to the zero offset Vg0 is equivalent to the reference value associated with the scan value (hereinafter called the "reference scan value"). When a reference scan value is obtained as the scan value, the actual dot ink quantity is equivalent to the reference dot ink quantity and the actual ink ejection amount per unit area is equivalent to the reference ink ejection amount specified by the print data. Hence, the zero offset Vg0 indicates that calibration of the ink ejection amount is unnecessary.

The scan values correlated with positive offsets Vg are larger than the scan value correlated with the zero offset Vg0. A larger scan value indicates a brighter image and, hence, that the actual ink ejection amount is smaller than the reference ink ejection amount. Therefore, a positive offset Vg indicates a need to increase the ink ejection amount. Further, it is desirable to increase the ink ejection amount more for larger offsets Vg.

Conversely, scan values associated with negative offsets Vg are smaller than the scan value associated with the zero offset Vg0. A smaller scan value indicates a darker image and, hence, that the actual ink ejection amount is greater than the reference ink ejection amount. Therefore, a negative offset Vg indicates a need to reduce the ink ejection amount. Further, it is desirable to decrease the ink ejection amount more for smaller offsets Vg (as the absolute value of the offset Vg increases).

Generally, the ratio of change in scan value to change in ink ejection amount is not constant, but varies with the ink ejection amount. That is, the relationship between the ink ejection amount and scan value is nonlinear. Hence, it is difficult to calibrate the ink ejection amount appropriately by using the scan value directly since such a method necessitates calibration based on this nonlinear relationship. Therefore, rather than calibrating the ink ejection amount directly using the scan value, an offset Vg representing offset between the scan value and a predetermined reference value is set based on the scan value in the first embodiment. More particularly, in the first embodiment the offset Vg is set so as to change almost linearly in response to changes in the ratio of the ink ejection amount difference (reference ink ejection amount−actual ink ejection amount) to the actual ink ejection amount. Hereinafter, the ratio of ink ejection amount difference (reference ink ejection amount−actual ink ejection amount) to the actual ink ejection amount will be called the "difference ratio." The difference ratio denotes the ratio of the preferred calibration amount to the actual ink ejection amount. If the calibration value for calibrating the ink ejection amount is determined using an offset Vg that changes almost linearly in response to this difference ratio, a suitable ink ejection amount can be more easily produced than when setting a calibration value or calibrating the ink ejection amount directly based on the scan value. This will be described later in greater detail.

The correlations 134a-134f for producing the offsets Vg described above can be determined through experimentation. For example, by printing a plurality of patches with slightly differing dot recording rates and acquiring scan values for each of the patches, correlations between the dot recording rates and scan values can be obtained. Since a dot recording rate is equivalent to the ink ejection amount per unit area, these correlations can be used to identify correlations between actual ink ejection amounts and scan values. The identified correlations can then be used to determine correlations between offsets Vg that change substantially linearly in response to changes in the difference ratio, and scan values corresponding to these offsets Vg. In other words, the predetermined scan values correspond to the actual ink ejection amounts having the difference ratios corresponding to the predetermined offsets Vg.

The reference scan value associated with the zero offset Vg0 can be freely adjusted to obtain desired printing results. For example, the scan value of a patch printed with a reference multifunction peripheral 100 may be employed as the reference scan value. In addition, different reference scan values may be used among the plurality of correlations 134a-134f (the plurality of patches). In this case, it is preferable to use values that change almost linearly in response to changes in the difference ratio as the offsets Vg, rather than values that represent the simple ink ejection amount differences (reference ink ejection amount−actual ink ejection amount, for example). In other words, each of the predetermined scan values is set to an actual measured value that has been measured from the corresponding test image with an actual usage amount of the predetermined colorant when the test image (test patch) was printed based on a target usage amount of the predetermined colorant. Offsets Vg that represent such relative values (difference ratios) can be appropriately used in common for the plurality of patches. For example, correlations between scan values and offsets Vg can be set so that scan values associated with substantially the same offset Vg are obtained from all patches formed by the reference multifunction peripheral 100. These correlations can be determined through experimentation.

The correlations 134a-134f for producing offsets Vg that change almost linearly in response to changes in the difference ratio normally have the characteristics described below. FIG. 4 shows a reference scan value S0, a first scan value Sp, and a second scan value Sm (where Sp>S0>Sm) defined by the first correlation 134a. The zero offset Vg0 is associated with the reference scan value S0. A first offset Vgp is associated with the first scan value Sp. A second offset Vgm is associated with the second scan value Sm. Here, the reference and first scan values S0 and Sp will be called the first scan value pair SP1, while the reference and second scan values S0 and Sm will be called the second scan value pair SP2. The two offsets Vg0 and Vgp are associated with the first scan value pair SP1 and will be called the first offset pair VP1, while the two offsets Vg0 and Vgm are associated with the second scan value pair SP2 and will be called the second offset pair VP2.

The first scan value pair SP1 has a difference SD1 of "9", while the second scan value pair SP2 has a difference SD2 of "8". Thus, the two differences SD1 and SD2 also differ from each other. The first offset pair VP1 has a difference VD1 of "5", and the second offset pair VP2 has a difference VD2 of "5". The two differences VD1 and VD2 are the same. Therefore, the two offset pairs VP1 and VP2 having the same difference are correlated with the two scan value pairs SP1 and SP2 having a different difference, making correlations between the scan values and offsets Vg nonlinear. Employing such nonlinear correlations between the scan values and offsets Vg can produce offsets Vg that change almost linearly in response to changes in the difference ratio.

While the example described above uses two scan value pairs SP1 and SP2 sharing a single reference scan value S0, the process is similar for two scan value pairs that do not share the same reference scan value. For example, in the correlation 134a shown in FIG. 4, the scan value pairs associated with the offsets Vg "+1" and "+5" (149 and 157) have a difference of 8, which is not equivalent to the difference of 7 between the scan value pairs associated with the offsets Vg of "−1" and "−5" (147 and 140).

Relationships are similarly set for the other correlations 134b-134f, as well as the correlations 134g-134l for patches formed in black ink (here offsets Vb are set based on the scan values).

FIG. 3 shows twelve offsets VgS1, VgM1, VgL1, VgS2, VgM2, VgL2, VbS1, VbM1, VbL1, VbS2, VbM2, and VbL2 respectively associated with the twelve scan values. The reference numbers assigned to these offsets are produced by replacing the leading character "S" of the corresponding scan value with a "V".

In S130 of FIG. 2, the first setting unit 220 determines whether the above process has been completed for all densities related to the current combination of target ink color and target size. When there remain unprocessed densities (S130: NO), the first setting unit 220 returns to S115 and repeats the above process for another density. When all densities have been processed (S130: YES), the first setting unit 220 advances to S132.

In S132 the first setting unit 220 determines whether all dot sizes have been processed for the current target ink color. When there remain unprocessed sizes (S132: NO), the first setting unit 220 returns to S112 and repeats the above process for another dot size. When all dot sizes have been processed (S132: YES), the first setting unit 220 advances to S135.

In S135 the first setting unit 220 sets a process offset based on the plurality of offsets found for the target ink color (the plurality of offsets set for different combinations of density and dot size). In the first embodiment, the first setting unit 220 calculates the average of these offsets to be the process offset. FIG. 3 shows process offsets Vga and Vba calculated for the two ink colors. The first process offset Vga is the average of the six offsets VgS1-VgL2 obtained from the magenta patches, while the second process offset Vba is the average of the six offsets VbS1-VbL2 obtained from the black patches. However, various other values representing the relationships among the plurality of offsets for the target ink color may be used as the process offset (a statistical quantity such as the average, mode, median, maximum, or minimum). In any case, the first setting unit 220 can set a first process offset Vga while suppressing the effects of measurement error contained in the scan values SgS1-SgL2 by setting a single process offset Vga based on the plurality of scan values SgS1-SgL2. Using the average of the offsets can produce a more suitable process offset Vga. The same holds true for the second process offset Vba.

In S140 of FIG. 2, the second setting unit 230 (see FIG. 1) adjusts the process offsets based on temperature. First, the second setting unit 230 identifies a temperature Tp by analyzing a portion of the scan data representing the barcode BC (see FIG. 3). Next, the second setting unit 230 references the temperature adjustment data 138 to identify an adjustment amount VTp associated with the temperature Tp (described later with reference to FIG. 5). Next, the second setting unit 230 calculates adjusted process offsets by adding the identified adjustment amount VTp to the process offsets. FIG. 3 shows a first adjusted process offset Vgb calculated from the first process offset Vga and a second adjusted process offset Vbb calculated from the second process offset Vba.

The graph in FIG. 5 shows an example of the temperature adjustment data 138, where the horizontal axis represents the temperature Tp and the vertical axis represents the adjustment amount VTp. The temperature adjustment data 138 defines correlations between the temperature Tp and the adjustment amount, VTp and is expressed by a function or a one-dimensional lookup table, for example. As shown in the graph, the adjustment amount VTp is −1 for temperatures Tp in a range less than a first temperature T1, and +1 for temperatures in a range greater than a second temperature T2. The adjustment amount VTp changes in proportion to the temperature Tp from −1 to +1 within the range between the first temperature T1 and second temperature T2. When the temperature Tp is equal to a reference temperature Ts, the adjustment amount VTp is 0. The reference temperature Ts is set to a typical temperature for a common operating environment of the multifunction peripheral 100 (25° C., for example). The temperature range in which the adjustment amount VTp changes (between T1 and T2) is set to include a range of temperatures in which the multifunction peripheral 100 can operate properly (for example, at least 9° C. and no greater than 40° C.).

As shown in FIG. 5, the adjustment amount VTp is set to a larger value when the temperature Tp is higher. The adjustment amount VTp is set to a larger value because higher temperatures Tp becomes lower the viscosity of the ink, increasing the dot ink quantity (i.e., increasing the ink ejection amount per unit area). As an example, let us assume that an offset Vg of −2 (see FIG. 4) is obtained when the temperature Tp is higher than the reference temperature Ts. It would stand to reason then that an offset Vg larger than −2 would be obtained if the same multifunction peripheral 100 were placed in an environment having a temperature equivalent to the reference temperature Ts because the quantity of ink ejected from the nozzles would be less.

As another example, let us assume that an offset Vg of +2 is obtained when the ambient temperature Tp is lower than the reference temperature Ts. It would stand to reason then that an offset Vg smaller than +2 would be obtained if the same multifunction peripheral 100 were placed in an environment having a temperature equivalent to the reference temperature Ts because the quantity of ink ejected from the nozzles would be more.

Thus, the adjustment amount VTp is a parameter designed to adjust the process offset obtained in ambient temperatures different from the reference temperature Ts to a process offset expected to be obtained in ambient temperatures equivalent to the reference temperature Ts. The temperature adjustment data 138 can be determined through experiments conducted to evaluate scan values of patches printed under various temperatures Tp. Note that it is conceivable that the ink ejection amount may decrease as the temperature Tp increases owing to the configuration of the printing unit 170. In such cases, the temperature adjustment data 138 is configured so that the lower adjustment amount VTp decreases as the temperature Tp increases. In either case, the correlations between temperatures Tp and adjustment amounts VTp may be based on any of various relationships determined through experimentation, such as relationships represented by a curve, and are not limited to proportional relationships.

In S145 of FIG. 2, the second setting unit 230 references the calibration table 136 to determine a calibration value from the adjusted process offset. FIG. 6 shows an example of the calibration table 136. The calibration table 136 defines correlations between adjusted process offsets and calibration values. In the first embodiment, the calibration table 136 defines four correlations 136c, 136m, 136y, and 136k for the four ink colors cyan, magenta, yellow, and black. The three correlations 136c, 136m, 136y, and 136k respectively identify cyan calibration values Cc, magenta calibration values Cm, and yellow calibration values Cy from a common first adjusted process offset Vgb (see FIG. 3). The correlation 136k for black ink identifies black calibration values Ck from the second adjusted process offset Vbb (see FIG. 3). In the example of FIG. 6, the correlation for each ink color comprises eleven combinations of offsets and calibration values. Calibration values for undefined offsets are set through interpolation and include a decimal component.

As will be described later, the calibration values Cc, Cm, Cy, and Ck are indices having a correlation with the ratio of post-calibrated ink ejection amounts to pre-calibrated ink ejection amounts. When the adjusted process offsets Vgb and Vbb are "0," the calibration values Cc, Cm, Cy, and Ck are all "1". A calibration value of "1" indicates that calibration of the ink ejection amount is not necessary (that the calibration amount is "0"). Thus, an ink ejection amount calibrated based on the calibration value "1" is equivalent to the pre-calibrated ink ejection amount. This will be described later in greater detail.

The calibration values Cc, Cm, Cy, and Ck are directly proportional to the adjusted process offsets Vgb and Vbb, whether the adjusted process offsets Vgb and Vbb fall within a range greater than 0 (a first range VRp) or a range less than 0 (a second range VRm). As described with reference to FIG. 4, the offsets Vg and Vb are configured to change almost linearly along with changes in the difference ratio. Consequently, the calibration values Cc, Cm, Cy, and Ck proportional to the adjusted process offsets Vgb and Vbb that have been set based on the offsets Vg and Vb have a correlation with the ratio of the reference ink ejection amount to the actual ink ejection amount. Therefore, a suitable ink ejection amount (reference ink ejection amount) can easily be achieved by calibrating the ink ejection amounts based on the calibration values Cc, Cm, Cy, and Ck.

The rate of change in the calibration values Cc, Cm, Cy, and Ck in response to changes in the adjusted process offsets Vgb and Vbb differs between the range of adjusted process offsets Vgb and Vbb above 0 (the first range VRp) and the range of adjusted process offsets Vgb and Vbb below 0 (the second range VRm) because the ratio of change in scan value to change in ink ejection amount is different when the ink ejection amount is large and when the ink ejection amount is small. In the first embodiment, the rate of change in the calibration values Cc, Cm, Cy, and Ck is greater in the first range VRp than in the second range VRm. Hence, if the absolute value of the adjusted process offsets Vgb and Vbb are the same, the change in ink ejection amount due to calibration with the calibration value is greater in the first range VRp than in the second range VRm.

Proper correlations between adjusted process offsets Vgb and Vbb and calibration values Cc, Cm, Cy, and Ck can be determined through experiments for evaluating calibration results obtained with various calibration values (post-calibration printing results). The rate of change in calibration values Cc, Cm, Cy, and Ck is gentler in the first range VRp than the second range VRm due to the properties of ink and characteristics of the reading unit 160.

In the example of FIG. 6, calibration values associated with the same first adjusted process offset Vgb are the same for cyan, magenta, and yellow. However, calibration values may be set differently among two or more ink colors for at least some of the first adjusted process offsets Vgb.

As described above, the second setting unit 230 sets calibration values based on the temperature Tp and process offsets. In S150 of FIG. 2, the second setting unit 230 stores the calibration values set in S145 in the nonvolatile storage device 130.

In S155 the second setting unit 230 determines whether the above process has been performed for all ink colors. If there remain unprocessed ink colors (S155: NO), the second setting unit 230 returns to S110 and repeats the above process. When the process has been completed for all ink colors (S155: YES), the second setting unit 230 ends the process in FIG. 2. At the completion of the process in FIG. 2, the nonvolatile storage device 130 stores calibration values Cc, Cm, Cy, and Ck for all ink colors.

A3. Generation of Print Data

Figure 7:
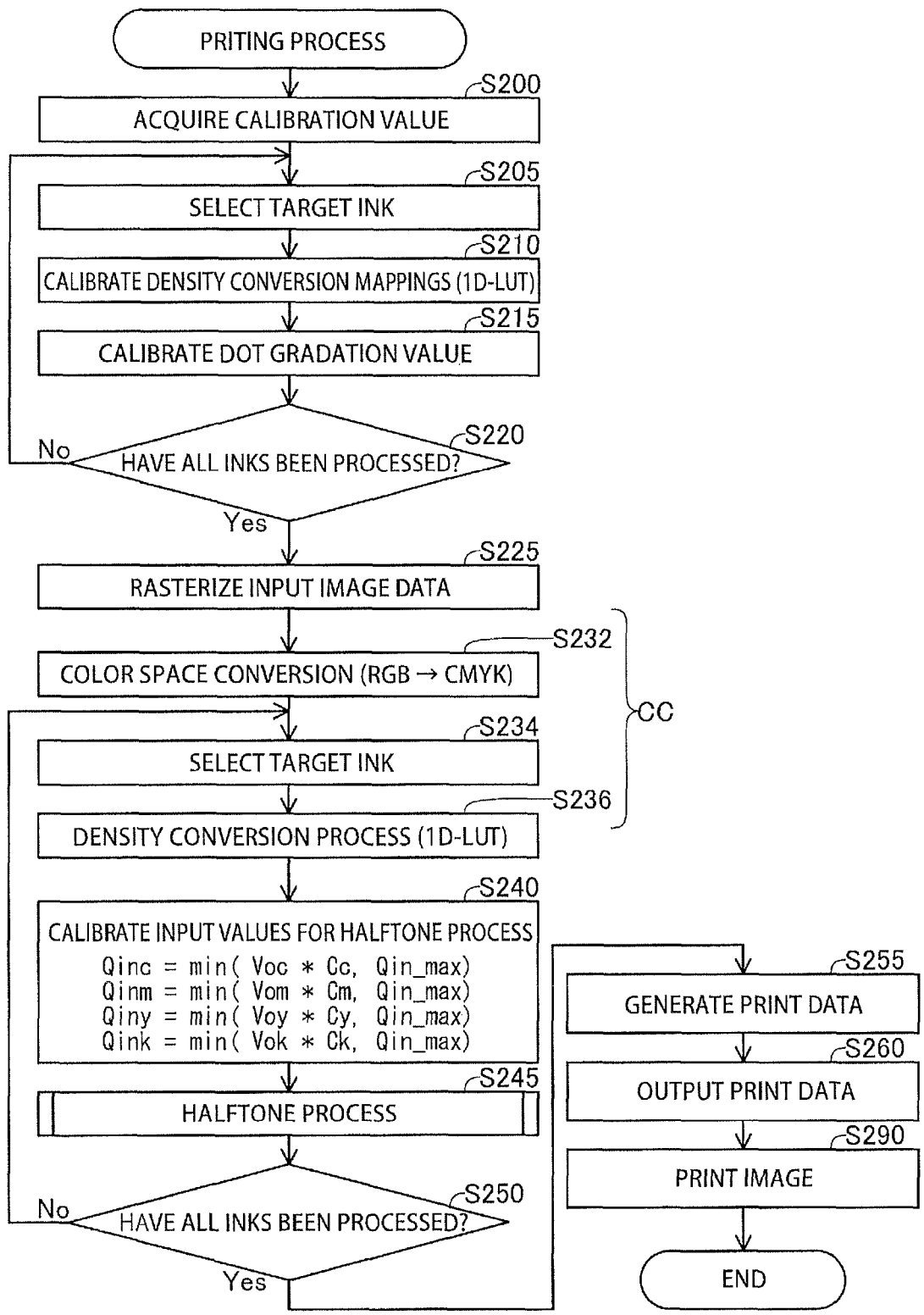
FIG. 7 is a flowchart illustrating steps in a printing process executed by the image processing device according to the first embodiment.

FIG. 7 is a flowchart illustrating steps in a printing process. In the printing process, ink ejection amounts are calibrated based on the calibration values Cc, Cm, Cy, and Ck described above (see FIG. 1). The image-processing unit 300 begins the printing process in FIG. 7 in response to a user command or when image data is acquired.

In S200 at the beginning of the printing process, the calibration value acquisition unit 310 (see FIG. 1) acquires the calibration values Cc, Cm, Cy, and Ck determined in S145 and stored in S150. In the first embodiment, the calibration value acquisition unit 310 acquires the calibration values Cc, Cm, Cy, and Ck from the nonvolatile storage device 130.

In S205 the calibration unit 320 (see FIG. 1) selects one of the plurality of ink colors available for printing in the printing unit 170 (cyan ink, magenta ink, yellow ink, and black ink in this example) that has not yet undergone the process in S215 for calibrating dot gradation values. This selected unprocessed ink color is set as the target ink color.

In S210 the calibration unit 320 calibrates density conversion mappings of the target ink color based on the calibration values for the target ink color. The mappings Gc, Gm, Gy, and Gk are used for converting densities (gradation values) of the plurality of ink colors used for printing (cyan (C), magenta (M), yellow (Y), and black (K) in this example) in S236 of FIG. 7 described later.

Figure 8:
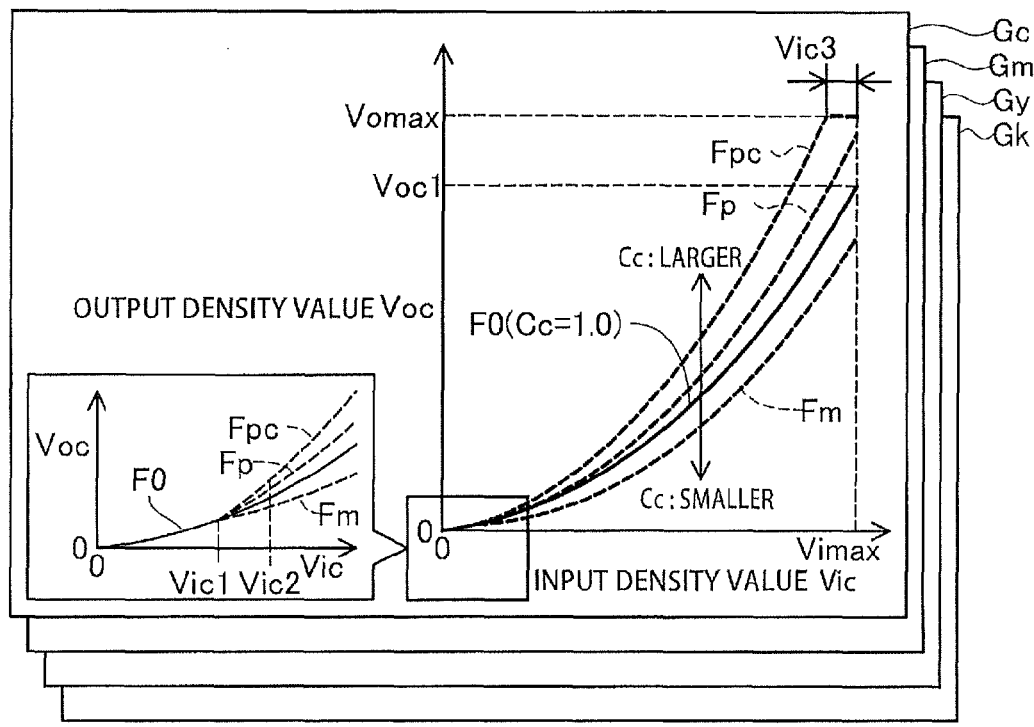
FIG. 8 is a graph showing an example of density conversion mappings in the first embodiment.

FIG. 8 is a graph showing an example of the density conversion mappings including the density conversion mappings Gc for cyan ink, Gm for magenta ink, Gy for yellow ink, and Gk for black ink. FIG. 8 shows details of the mapping Gc for cyan ink while omitting details of the mappings Gm, Gy, and Gk for other colors. Hence, the following description will reference the mapping Gc for cyan ink. The horizontal axis of the graph represents input density values Vic, while the vertical axis represents output density values (adjusted input density values) Voc. A reference curve F0 shown in FIG. 8 shows a predetermined correlation based on characteristics of the printing unit 170. According to the reference curve F0, the output density value Voc grows larger as the input density value Vic grows larger. When the cyan calibration value Cc is "1", the reference curve F0 is used as is, without adjustment. If the cyan calibration value Cc is greater than "1", the reference curve F0 is calibrated (to a first curve Fp, for example) so that the output density values Voc are greater than those defined by the reference curve F0. If the cyan calibration value Cc is less than "1", the reference curve F0 is calibrated (to a second curve Fm, for example) so that the output density values Voc are smaller than those in the reference curve F0. The reference curve F0 is calibrated by multiplying the output density values Voc in the reference curve F0 by the cyan calibration value Cc, for example.

The reference curve F0 is configured such that an output density value Voc1 is smaller than a maximum value Vomax (255, for example) within a predetermined range of possible output density values Voc that can be outputted by the multifunction peripheral 1 for a maximum value Vimax (255, for example) within a predetermined range of possible input density values Vic that can be received by the multifunction peripheral 1. Hence, when the cyan calibration value Cc is greater than "1", the output density value Voc can be increased even for the range of large input density values Vic (according to the first curve Fp, for example).

When the cyan calibration value Cc is greater than "1", the calibrated output density value Voc may exceed the maximum value Vomax of the allowable range of output density values Voc. In such cases, the calibration unit 320 resets the output density value Voc exceeding the maximum value Vomax to the maximum value Vomax according to a third curve Fpc (here, the output density value Voc is reset to the maximum value Vomax for input density values Vic greater than or equal to a third value Vic3), thereby avoiding any problems in image processing.

In the first embodiment, the output density value Voc is not adjusted for the range of input density values Vic less than or equal to a first value Vic1 (the bright range), thereby reducing the potential for unnatural adjustments within the bright range. Further, the output density values Voc are modified between the first value Vic1 and a second value Vic2 (adjusted to follow a straight line in the graph, for example) so as to be continuous between the first value Vic1 and second value Vic2 (Vic2>Vic1) in order to prevent the output density value Voc from changing in steps as the input density value Vic changes.

The pre-calibration reference curve F0 and post-calibration curve are defined in a one-dimensional lookup table, for example.

While the above description pertains to the mapping Gc for cyan, the density conversion mappings Gm, Gy, and Gk for the other ink colors are similarly calibrated with the calibration values Cm, Cy, and Ck of the corresponding ink colors.

Figure 9:
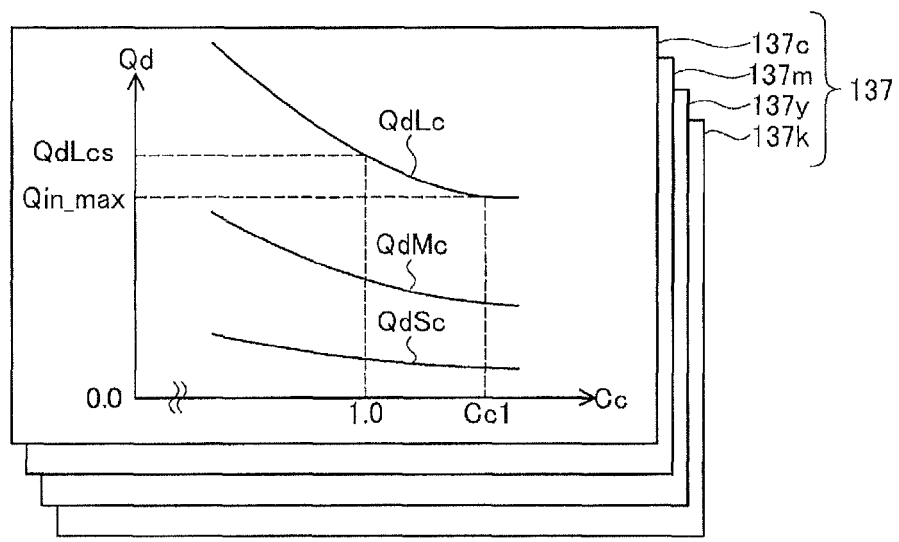
FIG. 9 is a graph showing an example of a dot gradation table stored in the image processing device according to the first embodiment.

In S215 of FIG. 7, the calibration unit 320 calibrates the dot gradation value of the target ink color by referencing the calibration value of the target ink color in the dot gradation table 137. FIG. 9 is a graph showing an example of the dot gradation table 137. The dot gradation table 137 includes a cyan table 137c, a magenta table 137m, a yellow table 137y, and a black table 137k. Only details of the cyan table 137c are shown in FIG. 9, while details of the other tables 137m, 137y, and 137k have been omitted. Thus, the following description will use the cyan table 137c as reference.

The graph in FIG. 9 shows sample relationships between the cyan calibration value Cc and dot gradation values QdLc, QdMc, and QdSc, where the horizontal axis represents the cyan calibration value Cc and the vertical axis represents the dot gradation value. The dot gradation values QdLc, QdMc, and QdSc are used in the halftone process of S245 described later. The large dot gradation value QdLc is associated with large dots. The medium dot gradation value QdMc is associated with medium dots. The small dot gradation value QdSc is associated with small dots. In the halftone process according to the first embodiment, which will be described later in greater detail, the image-processing unit 300 sets a dot formation state (dot pattern) for each pixel according to an error diffusion method. In this halftone process, the image-processing unit 300 sets various dot patterns based on the gradation values of pixels so that the dot formed at each pixel position represents the dot gradation value associated with the dot assigned that position. Generally, the color of a gradation value to be printed is rendered overall by forming dots at a plurality of pixel positions. The number of dots required for producing the specified gradation value increases as the dot gradation value grows smaller. Hence, reducing the dot gradation value increases the number of dots, resulting in a larger ink ejection amount per unit area. Conversely, increasing the dot gradation value decreases the number of dots, thereby decreasing the ink ejection amount per unit area.

As shown in FIG. 9, the large dot gradation value QdLc is greater than the medium dot gradation value QdMc, and the medium dot gradation value QdMc is greater than the small dot gradation value QdSc. Further, all of the dot gradation values QdLc, QdMc, and QdSc grow smaller as the cyan calibration value Cc grows larger. Specifically, the dot gradation values QdLc, QdMc, and QdSc are inversely proportional to the cyan calibration value Cc. Hence, the ink ejection amount per unit area can be increased more when the cyan calibration value Cc is greater than "1" than when the cyan calibration value Cc is "1". Similarly, the ink ejection amount per unit area can be decreased more when the cyan calibration value Cc is less than "1" than when the cyan calibration value Cc is "1".

The maximum gradation value Qin_max in FIG. 9 is the largest value (255, for example) within the predetermined range of possible input values for the halftone process (possible gradation values for cyan, magenta, yellow, and black). In a common halftone process (error diffusion method), it is preferable to set the dot gradation value of the largest dot to the maximum gradation value Qin_max or greater for the following reason. Let's assume that the dot gradation value for the largest dot were smaller than the maximum gradation value Qin_max. When printing a color at the maximum gradation value Qin_max in this case, excessive dots would be formed due to accumulated error, even when the dot recording rate of the largest dot is set to 100%.

Therefore, in the first embodiment, the large dot gradation value QdLcs is larger than the maximum gradation value Qin_max when the cyan calibration value Cc is "1" (when the calibration amount is zero). Hence, when the cyan calibration value Cc is greater than "1", the ink ejection amount can be increased by decreasing the large dot gradation value QdLc. Note that when the cyan calibration value Cc is large, the adjusted large dot gradation value QdLc may become smaller than the maximum gradation value Qin_max. In this case, the calibration unit 320 resets the large dot gradation value QdLc that is smaller than the maximum gradation value Qin_max to the maximum gradation value Qin_max. Thus, the large dot gradation value QdLc is reset to the maximum gradation value Qin_max for the range of cyan calibration values Cc greater than or equal to a first value Cc1.

In the first embodiment, the ratio of change in the dot gradation value to change in the cyan calibration value Cc differs according to dot size. For example, the ratio of change in dot gradation value to change in cyan calibration value Cc is greater in FIG. 9 for larger dot sizes. Since the number of large dots is therefore purposely adjusted, the ink ejection amount can be suitably calibrated.

While the above description covers only the cyan table 137c, the tables 137m, 137y, and 137k for the other ink colors similarly calibrate dot gradation values based on the calibration values Cm, Cy, and Ck of the corresponding ink colors. Each of the tables 137c, 137m, 137y, and 137k are one-dimensional lookup tables, but other data defining correspondences (equations, for example) may be employed.

In S220 of FIG. 7, the calibration unit 320 determines whether density conversion mappings and dot gradation values have been calibrated for all ink colors. If there remain unprocessed ink colors (S220: NO), the calibration unit 320 returns to S205 and repeats the above process for an unprocessed color. When calibrations have been completed for all ink colors (S220: YES), the process advances to S225.

In S225 the print data generation unit 330 (see FIG. 1) acquires input image data to be printed (for example, JPEG data specified by the user) and converts (rasterizes) the input image data to bitmap data of the required resolution for printing. The bitmap data generated in S225 represents the color of each pixel with gradation values (one of 256 levels, for example) for the three color components red, green, and blue, for example.

In S232 the print data generation unit 330 converts the color space of the bitmap data. In the first embodiment, the print data generation unit 330 converts the gradation values for red, green, and blue to gradation values for the ink colors (cyan, magenta, yellow, and black in this example) for each pixel. Correlations between RGB and CMYK values are preset.

In S234 the print data generation unit 330 selects one of the ink colors used in printing that has not yet undergone the halftone process described later in S245. The unprocessed ink color selected in S234 is set as the target ink color.

In S236 the print data generation unit 330 converts the densities of the target ink color. Specifically, the print data generation unit 330 acquires the densities of the target ink color selected in S234 among CMYK gradation values acquired in S232 and converts the gradation values of the target ink color based on the density conversion correlations (FIG. 8) that were calibrated in S210. As a result, the gradation values for the target ink color are converted based on calibration values for the target ink color.

The color space conversion process of S232 and the density conversion process of S236 together constitute the process for converting unprocessed colors to processed colors. Therefore, steps S232 and S236 may be collectively called the color conversion process CC.

In S240 the calibration unit 320 calibrates input values for the halftone process (gradation values for the target ink color). The equations used for these calibrations are shown in S240 of FIG. 7. The values Qinx (where "x" is one of "c" (cyan), "m" (magenta), "y" (yellow), and "k" (black)) represent the calibrated gradation values. The values Vox (where "x" is one of cmyk) represent the pre-calibrated gradation values (the output density values Voc determined by the pre-calibration reference curve F0 in FIG. 8). Qin_max is the largest possible input value that can be accepted in the halftone process. In other words, Qin_max is a maximum value within a predetermined range of input values that are capable of being processed in the halftone process. The function min(A, B) is a function that returns the smaller of values A and B. In other words, a value (calibrated input value) Voc*Cc is adjusted to the maximum value Qin_max if Voc*Cc is greater than Oin_max. The input value is changed such that a maximum value within a predetermine range of values Voc*Cc that can be determined by the multifunction peripheral 1 is smaller than the maximum value Oin_max.

For example, the calibrated cyan gradation value Qinc is computed by multiplying the pre-calibrated cyan gradation value (output density value) Voc by the cyan calibration value Cc. When the cyan calibration value Cc is "1", the calibrated cyan gradation value Qinc is equivalent to the pre-calibrated cyan gradation value Voc. When the cyan calibration value Cc is greater than "1", the calibrated cyan gradation value Qinc is greater than the pre-calibrated cyan gradation value Voc. When the cyan calibration value Cc is less than "1", the calibrated cyan gradation value Qinc is smaller than the pre-calibrated cyan gradation value Voc. In this way, the calibrated cyan gradation value Qinc can be calibrated appropriately based on the cyan calibration value Cc. When the calibrated cyan gradation value Qinc exceeds the maximum gradation value Qin_max, the calibrated cyan gradation value Qinc is set to the maximum gradation value Qin_max to reduce the potential for problems arising in the halftone process. This calibration is similarly performed on gradation values for the other ink colors.

In the first embodiment, the maximum value Vomax of the density-converted output density value Voc described in FIG. 8 is equivalent to the maximum gradation value Qin_max of input gradation values Qin for the halftone process described in FIG. 9. As described with reference to FIG. 8, when the cyan calibration value Cc is "1" (representing a calibration amount of zero), the density-converted output density value Voc is smaller than the maximum value Vomax. Hence, the output density value Voc used in the halftone process is smaller than the maximum gradation value Qin_max. Therefore, when the cyan calibration value Cc is greater than "1", in S240 the calibration unit 320 can produce a calibrated cyan gradation value Qinc greater than the pre-calibrated gradation value. This also holds true for input values of the other ink colors.

Figure 10:
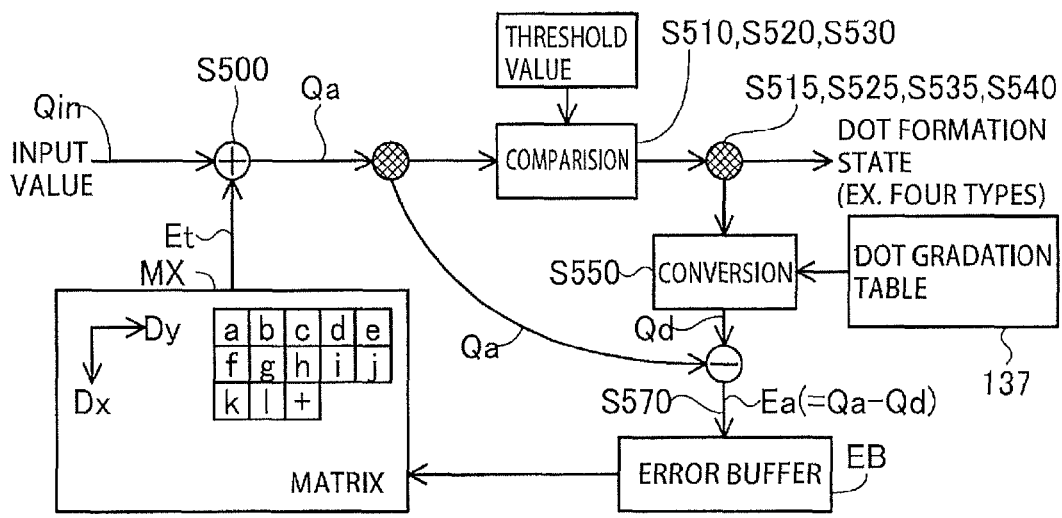
FIG. 10 is an explanatory diagram illustrating a halftone process executed by the image processing device according to the first embodiment.
Figure 11:
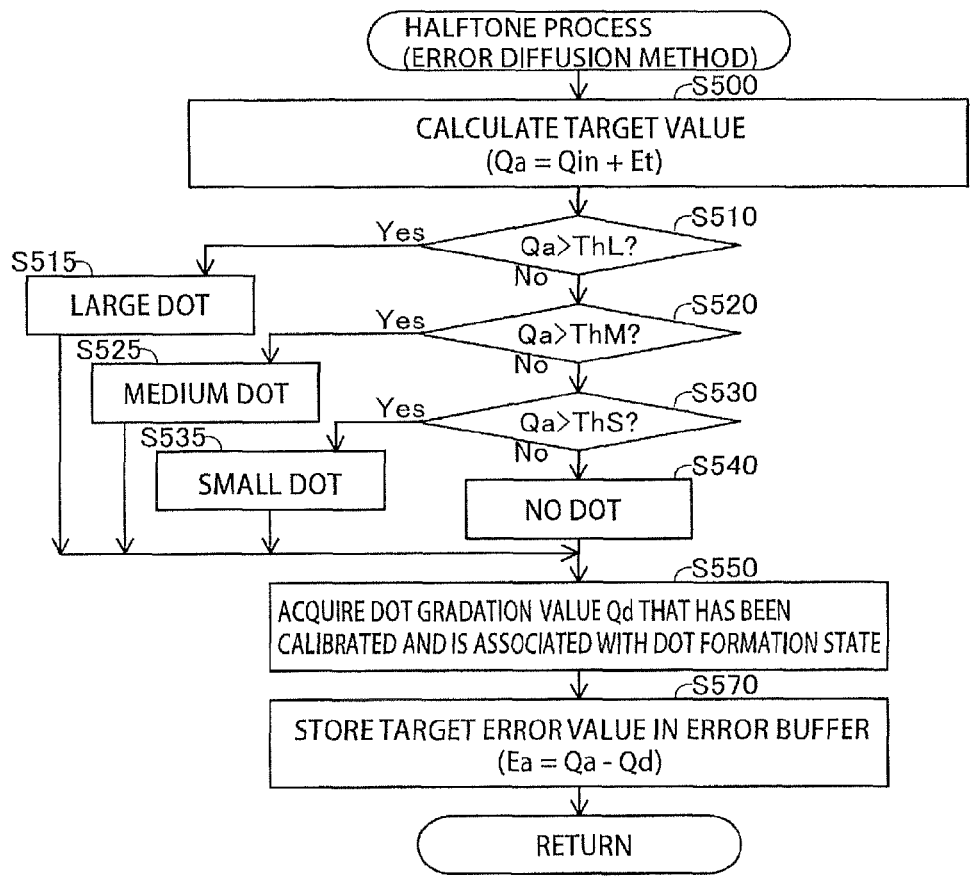
FIG. 11 is a flowchart showing steps in the halftone process executed by the image processing device according to the first embodiment.

In S245 the print data generation unit 330 performs the halftone process. FIG. 10 is an explanatory diagram illustrating the halftone process, and FIG. 11 is a flowchart showing steps in the halftone process. The halftone process will be described next while referring to the steps in FIG. 11.

In S500 at the beginning of the halftone process, the print data generation unit 330 calculates an error value Et for the print pixel being subjected to this process (hereinafter referred to as the "target pixel") using the matrix MX and the error buffer EB. As will be described later, the error buffer EB stores a density error (gradation error value) for each pixel. The matrix MX is a Jarvis, Judice & Ninke matrix, for example, that assigns weights greater than 0 to neighboring pixels at prescribed relative positions around the target pixel. In the matrix MX of FIG. 10, the "+" symbol represents the target pixel, and weights a-1 are assigned to prescribed peripheral pixels. The values of the weights a-1 total "1". Based on these weights, the print data generation unit 330 calculates the error value Et of the target pixel to be the weighted sum of error values for the peripheral pixels. Next, the print data generation unit 330 calculates a target gradation value Qa as the sum of the error value Et and a gradation value of the target pixel (hereinafter called the "input gradation value Qin"; the gradation value of cyan, for example).

In the subsequent processes of S510-S540 the print data generation unit 330 sets the dot formation state of the target pixel based on the relative magnitude of the target gradation value Qa to three thresholds ThL, ThM, and ThS. In the first embodiment, the input gradation value Qin is one of 256 levels, from 0 to 255. The large dot threshold ThL is the threshold for outputting a large dot (a value of 170, for example). The medium dot threshold ThM is the threshold for outputting a medium dot (a value of 84, for example). The small dot threshold ThS is the threshold for outputting a small dot (a value of 0, for example).

The print data generation unit 330 sets the dot formation state (dot size) as follows.

A) When target gradation value Qa>large dot threshold ThL (S510: YES), dot formation state="large dot" (S515)

B) When target gradation value Qa≤large dot threshold ThL and target gradation value Qa>medium dot threshold ThM (S510: NO, S520: YES), dot formation state="medium dot" (S525)

C) When target gradation value Qa≤medium dot threshold ThM and target gradation value Qa>small dot threshold ThS (S520: NO, S530: YES), dot formation state="small dot" (S535)

D) When target gradation value Qa≤small dot threshold ThS (S530: NO), dot formation state="no dot" (S540)

In S550 following the determination of the dot formation state, the print data generation unit 330 acquires (converts) the gradation value associated with this dot formation state (hereinafter referred to as the "dot gradation value Qd"). The dot gradation value acquired in S550 is the calibrated value described in S215 of FIG. 7 and with reference to FIG. 9. When the dot formation state is "no dot," the dot gradation value is "0".

In S570 the print data generation unit 330 calculates a target error value Ea according to the following equation.

Target error value $Ea$=target gradation value $Qa$–dot gradation value $Qd$

The print data generation unit 330 records the target error value Ea calculated according to the above equation in the error buffer EB as the error value for the target pixel. In the process of S500, the target error value Ea recorded in the error buffer EB is used as an error value for peripheral pixels corresponding to different target pixels.

The print data generation unit 330 sets the dot formation state of each print pixel according to the method described above for each of the ink colors. The calibrated dot gradation values are used in S550 and S570. While the dot gradation values are variable, the procedure of the halftone process does not change. Therefore, the ink ejection amounts (printed results) can be suitably controlled without making the halftone process more complex. Further, since dot calibration values are calibrated for each of the three dot sizes used in printing, the ink ejection amounts can be suitably controlled when a plurality of dot sizes are employed.

In S250 of FIG. 7, the print data generation unit 330 determines whether the halftone process has been completed for all ink colors. If there remain unprocessed ink colors (S250: NO), the print data generation unit 330 returns to S234 and repeats the above process with another ink color. However, if all ink colors have undergone the halftone process (S250: YES), the print data generation unit 330 advances to S255.

In S255 the print data generation unit 330 generates print data using the results of the halftone process (the dot formation state of each pixel determined in S515, S525, S535, and S540 of FIG. 11). Print data is data representing results of the halftone process in a format that can be interpreted by the printing unit 170.

In S260 the data output unit 340 (see FIG. 1) outputs the print data generated in S255. In the first embodiment, the data output unit 340 outputs the print data to the printing unit 170. In S290 the printing unit 170 prints an image based on the print data received from the data output unit 340.

As described above, the measurement value acquisition unit 210 according to the preferred embodiment acquires scan values (scan values SgS1-SbL2 in FIG. 3) produced when the reading unit 160 optically reads printed images (patches PmS1-PkL2 in FIG. 3). The first setting unit 220 then uses these scan values to set offsets (Vga and Vba in FIG. 3) representing variation between the scan values and reference scan values. The second setting unit 230 uses the offsets to set control values (calibration values Cc, Cm, Cy, and Ck in FIG. 3) for regulating ink ejection amounts. Setting control values based on offsets in the scan values in this way facilitates regulation of the ink ejection amounts.

A particular feature of the invention is that the first setting unit 220 of the first embodiment sets offsets (the offsets VgS1-VbL2 obtained for the plurality of patches) so as to change essentially linearly in response to changes in the difference ratio, as described with reference to FIGS. 4 and 6. Accordingly, correlations can easily be set between offsets and control values (calibration values Cc, Cm, Cy, and Ck in FIG. 3) for controlling the ink ejection amounts. The calibration unit 320 can then easily produce suitable ink ejection amounts based on the control values (calibration values) set according to the offsets. For example, as described with reference to FIG. 5, the second setting unit 230 easily sets control values suited to various combinations of density and dot size by adjusting a first parameter (the first process offset Vga) based on the temperature Tp. Further, as described with reference to FIG. 8, the calibration unit 320 can suitably calibrate correlations between gradation values prior to density conversion and gradation values after density conversion using control values (calibration values Cc, Cm, Cy, and Ck). Further, as described with reference to FIG. 9, the calibration unit 320 can execute a halftone process suited to the various combinations of density and dot size by calibrating the dot gradation values using the control values (calibration values Cc, Cm, Cy, and Ck). Further, as described in S240 of FIG. 7, the calibration unit 320 can suitably calibrate input values for the halftone process using the control values (calibration values Cc, Cm, Cy, and Ck).

Since suitable ink ejection amounts can be produced based on the calibration values Cc, Cm, Cy, and Ck, larger manufacturing error can be allowed when designing a printing unit 170 capable of producing precise dot ink quantities, thereby enhancing the design flexibility for the printing unit 170. For example, the manufacturer can design drive signals for the print head that focus on stability of dot ink quantities and dot recording positions.

As described with reference to FIG. 5, the second setting unit 230 sets the adjusted process offsets Vgb and Vbb using the process offsets Vga and Vba based on the temperature Tp of the printing unit 170 when the color patch set CP is printed. Hence, suitable calibration values Cc, Cm, Cy, and Ck can be set based on temperature when temperature causes changes in ink ejection amounts.

As shown in FIG. 3, the first setting unit 220 sets a single first process offset Vga based on the six scan values SgS1, SgM1, SgL1, SgS2, SgM2, and SgL2 obtained from the six magenta ink patches PmS1, PmM1, PmL1, PmS2, PmM2, and PmL2. Accordingly, the first setting unit 220 can set a suitable offset by suppressing the influence of error in the scan values. A particular advantage of the invention is that the first setting unit 220 in the first embodiment sets the six candidate offsets VgS1, VgM1, VgL1, VgS2, VgM2, and VgL2 based on the six scan values SgS1, SgM1, SgL1, SgS2, SgM2, and SgL2, and sets a single first process offset Vga by taking the average of the candidate offsets. Accordingly, the first setting unit 220 can set a first process offset Vga that appropriately reflects the six scan values. Here, the number of patches used to set a single offset is not limited to six, but may be any number N (where N is an integer of 2 or greater). It is preferable that the same ink be used for the N patches and that the combinations of density and dot size be different from patch-to-patch.

As shown in FIG. 3, the magenta calibration value Cm and the black calibration value Ck are set independently from patches formed in the respective ink colors, enabling suitable calibration values to be set for corresponding ink colors. As described in the printing process of FIG. 7, the calibration target for magenta ink (the output value of FIG. 8, the dot gradation value of FIG. 9, and the input value in S240 of FIG. 7) is calibrated based on the magenta calibration value Cm, while the calibration target for black ink is similar calibrated using the black calibration value Ck. Accordingly, printing results can be suitably controlled when these ink colors are used in printing.

This is particularly important because the magenta ink is dye-based ink while the black ink is pigment ink in the preferred embodiment. If the calibration values for these two different types of inks are set independently, suitable calibration values can be determined irrespective of the colorant type.

As described with reference to FIG. 3, scan values acquired from patches PmS1, PmM1, PmL1, PmS2, PmM2, and PmL2 that were printed with magenta ink are represented by green color values (i.e., values expressing the intensity of the green component), since green has a complementary relationship with magenta. Therefore, the control-processing unit 200 can acquire scan values that appropriately reflect small changes in patch density (actual ink quantity). Further, since humans have a relatively high sensitivity to green compared to other colors, green color values can be used to set calibration values better suited to the visual perception of humans.

As described with reference to FIG. 7, the calibration unit 320 performs calibration to generate print data using calibration values Cc, Cm, Cy, and Ck obtained from printed patches (S200, S210, S215, and S240). In this way, the calibration unit 320 can appropriately control the print data (printed results).

Further, the calibration values Cc, Cm, Cy, and Ck used for regulating print data to be outputted to the printing unit 170 are set based on patches included in the color patch set CP printed by the same printing unit 170. Consequently, calibration values Cc, Cm, Cy, and Ck suitable for the printing unit 170 can be used to control the generation of print data to be outputted to the printing unit 170.

B. Second Embodiment

Figure 12:
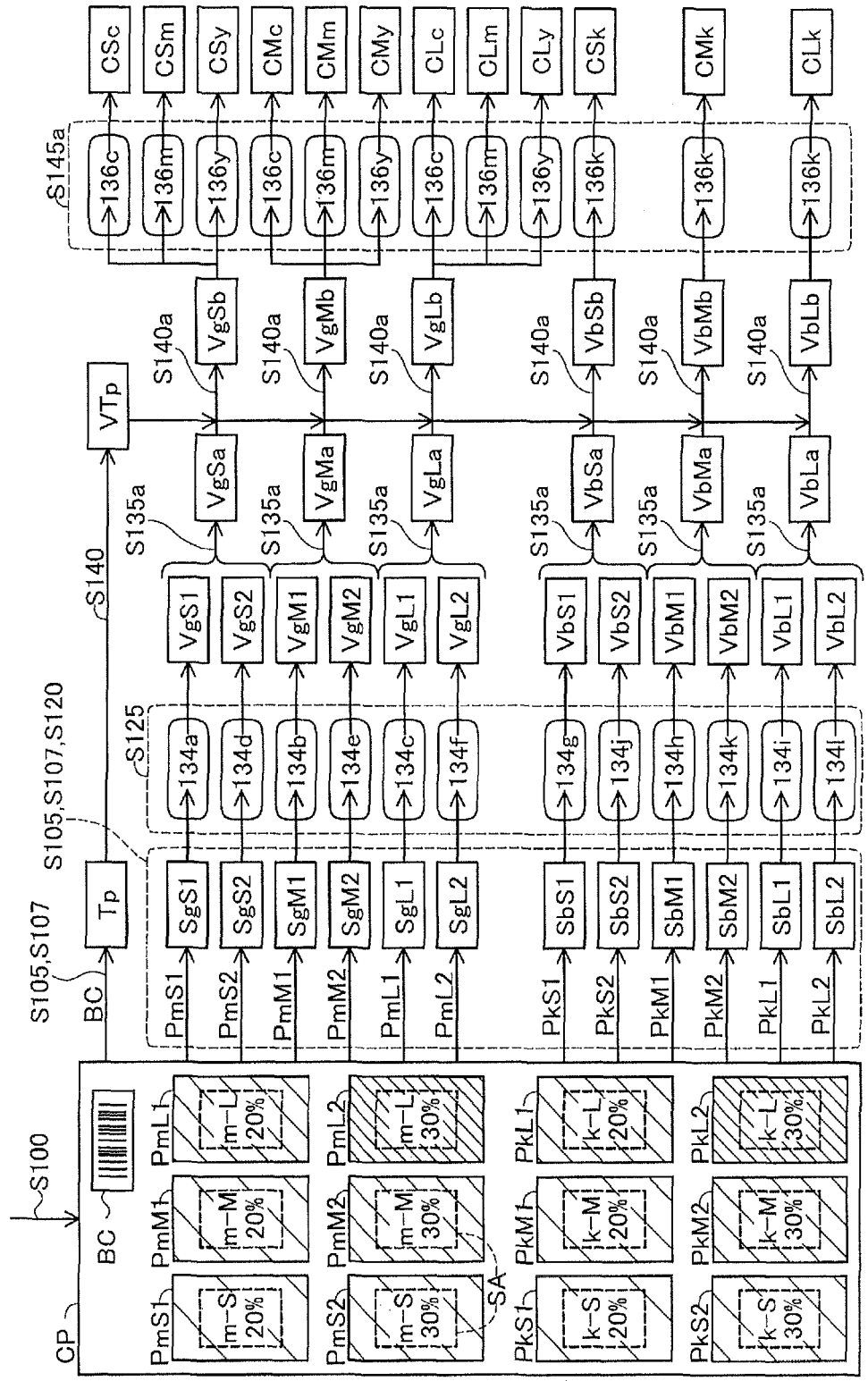
FIG. 12 is an explanatory diagram illustrating a calibration value determining process executed in a second embodiment of the present invention.
Figure 13:
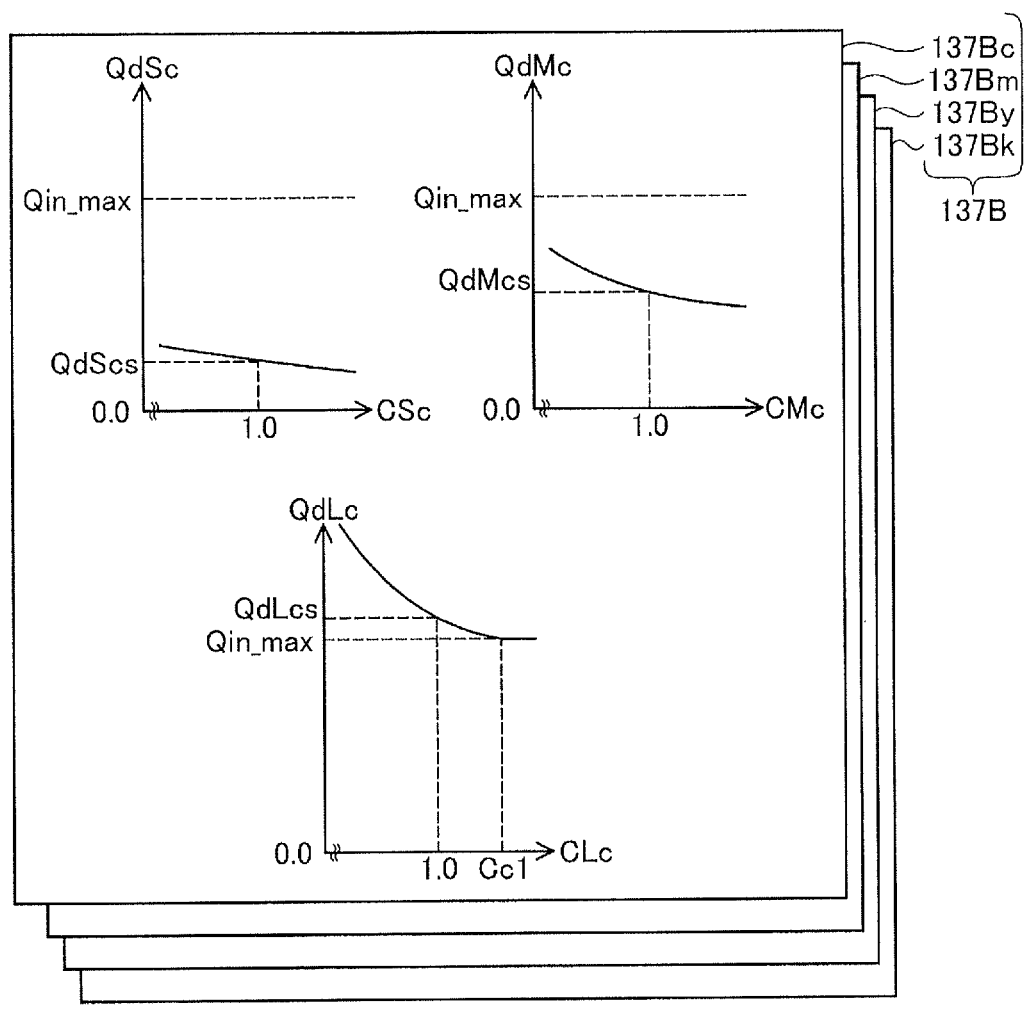
FIG. 13 is a graph showing dot gradation tables used in the second embodiment.

FIGS. 12 and 13 are explanatory diagrams illustrating processes according to the second embodiment. FIG. 12 illustrates a calibration value determining process for setting calibration values, and FIG. 13 is a graph showing dot gradation tables in the second embodiment. The multifunction peripheral 100 according to the second embodiment is identical to that described in the first embodiment with reference to FIG. 1 (i.e., has the same hardware configuration). In the second embodiment, calibration values are set for each dot size, and dot gradation values are adjusted based on the calibration values set for each dot size.

The diagram of FIG. 12 corresponds to that of FIG. 3 in the first embodiment, and like elements are designated with the same reference numerals to avoid duplicating description. The only difference from the first embodiment (FIGS. 2 and 3) is that steps S135, S140, and S145 have been replaced with steps S135a, S140a, and S145a. All other steps are identical to those in the first embodiment. The following description will focus on steps S135a, S140a, and S145a, while omitting a detailed description of the other steps.

In S135a, the first setting unit 220 sets a single process offset based on the plurality of offsets sharing the same target ink color and target size but having different densities. The method of calculating the process offset from the plurality of offsets is identical to that described in the first embodiment. FIG. 3 shows six process offsets VgSa, VgMa, VgLa, VbSa, VbMa, and VbLa calculated for the different combinations of ink color and dot size. The reference characters for the process offsets include a character representing the dot size (one of characters "S", "M", and "L" denoting small, medium, and large, respectively). The process offset VgMa, which indicates a medium dot in magenta ink, is set based on the two offsets VgM1 and Vgm2 corresponding to the two possible combinations of magenta ink and medium dot. The process offset VgMa is set to the average of these values in the preferred embodiment. The other process offsets are set similarly.

In S140a, the second setting unit 230 adjusts the process offsets VgSa, VgMa, VgLa, VbSa, VbMa, and VbLa based on temperature. The method of adjustment is identical to the method in S140 of the first embodiment and produces six adjusted process offsets VgSb, VgMb, VgLb, VbSb, VbMb, and VbLb.

In S145a the second setting unit 230 sets a calibration value from the adjusted process offset. Calibrations values are set for each combination of ink color and dot size. FIG. 12 shows twelve calibration values CSc-CLk set in S145a. Reference characters representing the calibration values include a character representing dot size (one of "S", "M", and "L" for small, medium, or large, respectively), and a character representing ink color (one of "c", "m", "y", and "k" representing cyan, magenta, yellow, and black, respectively). The calibration table 136 described in the first embodiment with reference to FIG. 6 is also used for defining correlations between adjusted process offsets and calibration values. As described above, in the first embodiment correlations are set for each ink color. The same correlations are used for setting a plurality of calibration values used for a common ink color at different dot sizes. The cyan correlation 136c is used for setting three calibration values CSc, CMc, and CLc for calibrating cyan dots.

As described above, the second setting unit 230 according to the second embodiment can set a suitable calibration value for each dot size by setting calibrations for each dot size based on different patches. The image-processing unit 300 then generates print data using the calibration values that have been set for each dot size. Steps in the printing process according to the second embodiment are identical to those of the first embodiment shown in FIG. 7.

The graph in FIG. 13 shows an example of a dot gradation table 137B used in place of the dot gradation table 137 shown in FIG. 9. Only details of a cyan table 137Bc are shown in FIG. 13, while details of the other ink tables 137Bm, 137By, and 137Bk have been omitted.

As shown in FIG. 13, the dot gradation values QdSc, QdMc, and QdLc for each dot size are adjusted using the gradation values CSc, CMc, and CLc for the corresponding size. Correlations between calibration values and dot gradation values are similar to the correlations obtained by replacing the cyan calibration value Cc in the correlation of FIG. 9 with the calibration values CSc, CMc, and CLc for each dot size. Correlations for other ink colors are similarly set.

In this way, the calibration unit 320 calibrates the dot gradation value for each dot size based on the calibration value for the corresponding size. Thus, the calibration unit 320 can suitably regulate ink ejection amounts (printing results). Note that the calibration table 136 (see FIG. 6) defines correlations between adjusted process offsets and calibration values for each combination of ink color and dot size.

In S210 and S240 of the printing process described in the first embodiment (FIG. 7), the calibration unit 320 uses common calibration values Cc, Cm, Cy, and Ck for all dot sizes of the respective colors. In the second embodiment, however, the second setting unit 230 uses a plurality of calibration values set for respective dot sizes (a plurality of calibration values sharing the same ink color) to set a single calibration value corresponding to a single ink color, and provides this calibration value in place of the calibration values Cc, Cm, Cy, and Ck. For example, the second setting unit 230 takes the average of the three calibration values CSc, CMc, and CLc for cyan and provides this average value in place of the cyan calibration value Cc. Further, any of various values representing the relationships among the plurality of calibration values may be used as the single calibration value (a statistical quantity, such as the average, mode, median, maximum, or minimum value). Alternatively, the second setting unit 230 in the second embodiment may also set the calibration values Cc, Cm, Cy, and Ck for corresponding ink colors according to the same procedure described in FIG. 3.

C. Third Embodiment

Figure 14:
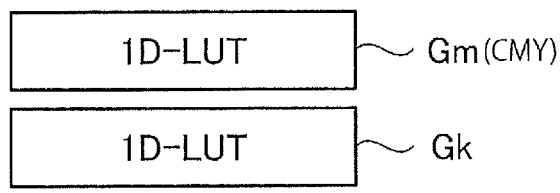
FIG. 14 shows density conversion correlations used in a third embodiment of the present invention.
Figure 15:
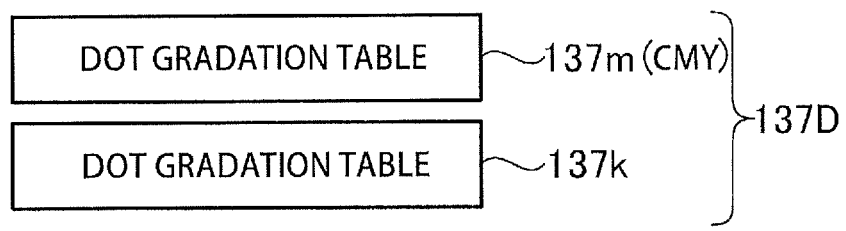
FIG. 15 shows dot gradation tables used in the third embodiment.
Figure 16:
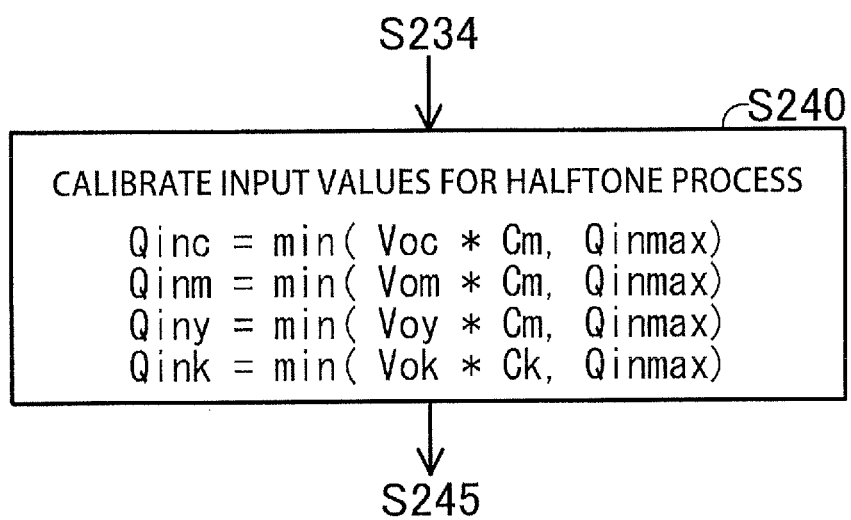
FIG. 16 is an explanatory diagram showing a method of calibrating halftone input values according to the third embodiment.

FIGS. 14 through 16 are explanatory diagrams illustrating a calibration process according to a third embodiment of the present invention. In the first and second embodiments described above, calibration values are set for each ink color (S145 of FIG. 2), and various values are calibrated for each ink color (S210, S215, and S240 of FIG. 7). In the third embodiment, a common calibration value is set for a plurality of ink colors, and a common calibration is performed on the plurality of ink colors. The multifunction peripheral 100 according to the third embodiment is identical to that described in the first embodiment with reference to FIG. 1 (i.e., has the same hardware configuration). Calibration values are set according to the same procedure shown in FIG. 2. However, in S145 the second setting unit 230 sets the magenta calibration value Cm and black calibration value Ck, but does not set a cyan calibration value Cc or yellow calibration value Cy. The remaining steps of the calibration process according to the third embodiment are identical to those described in the first embodiment. The printing process according to the third embodiment is performed according to the same procedure shown in FIG. 7. However, steps S210, S215, S236, and S240 are modified as described below.

FIG. 14 shows the density conversion correlations used in the third embodiment. As shown in FIG. 14, only the magenta mapping Gm and the black mapping Gk are used in the third embodiment, while the cyan mapping Gc and the yellow mapping Gy are omitted. In S210 of FIG. 7, the calibration unit 320 calibrates the magenta mapping Gm using the magenta calibration value Cm set based on magenta patches, and calibrates the black mapping Gk using the black calibration value Ck set based on black patches. In S236 of FIG. 7, the print data generation unit 330 applies the magenta mapping Gm calibrated using the magenta calibration value Cm to magenta gradation values, as well as to cyan and yellow gradation values.

FIG. 15 shows a dot gradation table 137D used in the third embodiment. As shown in FIG. 15, the dot gradation table 137D includes the magenta table 137m and the black table 137k, but omits the cyan table 137c and yellow table 137y. In S215 of FIG. 7 the calibration unit 320 references the magenta table 137m and calibrates the magenta dot gradation value based on the magenta calibration value Cm set according to the magenta patches. The calibration unit 320 also references the black table 137k to calibrate the black dot gradation values based on the black calibration value Ck set according to the black patches. In S245 of FIG. 7 (S550 of FIG. 11), the print data generation unit 330 applies the magenta dot gradation value calibrated using the magenta calibration value Cm to the magenta halftone process, as well as to the cyan and yellow halftone processes.

FIG. 16 is an explanatory diagram showing the method of calibrating halftone input values (S240) according to the third embodiment. This process differs from S240 of FIG. 7 only in that the magenta calibration value Cm is used for calculating the calibrated cyan gradation value Qinc and calibrated yellow gradation value Qiny in addition to the calibrated magenta gradation value Qinm. Thus, when calculating the cyan, magenta, and yellow calibrated gradation values Qinc, Qinm, and Qiny, the calibration unit 320 uses the same magenta calibration value Cm set based on magenta patches to calibrate the pre-calibration gradation values Voc, Vom, and Voy.

In the third embodiment described above, the print data generation unit 330 uses a value calibrated with the magenta calibration value Cm (for example, the output value of the magenta mapping Gm in FIG. 14, the dot gradation value in FIG. 15, or the post-calibrated gradation value in FIG. 16) in the process for cyan ink, which is a similar type (pigment) to magenta ink, but different in color. The same process for cyan ink is also performed for yellow ink. These modifications simplify the printing process in the third embodiment.

Further, the ink colors to which the same calibration value is applied are composed of the same type of colorant (pigment ink in this example). Hence, printing results can be controlled more appropriately than when applying the same calibration values to ink of different types.

Note that the cyan mapping Gc and the yellow mapping Gy may be applied in S236 of FIG. 7 rather than omitted as in the example of FIG. 14. Similarly, the cyan table 137c and yellow table 137y may be applied in S245 of FIG. 7 rather than omitted as in the example of FIG. 18. In either case, the calibration unit 320 may calibrate the mappings Gc and Gy and the tables 137c, and 137y based on the magenta calibration value Cm, and the print data generation unit 330 may perform processes for cyan and yellow ink using a value calibrated by the magenta calibration value Cm. Further, the calibration value applied in common to multiple ink colors is not limited to the magenta calibration value Cm, but may be a calibration value for another color (the cyan calibration value Cc, for example).

D. Fourth Embodiment

Figure 17:
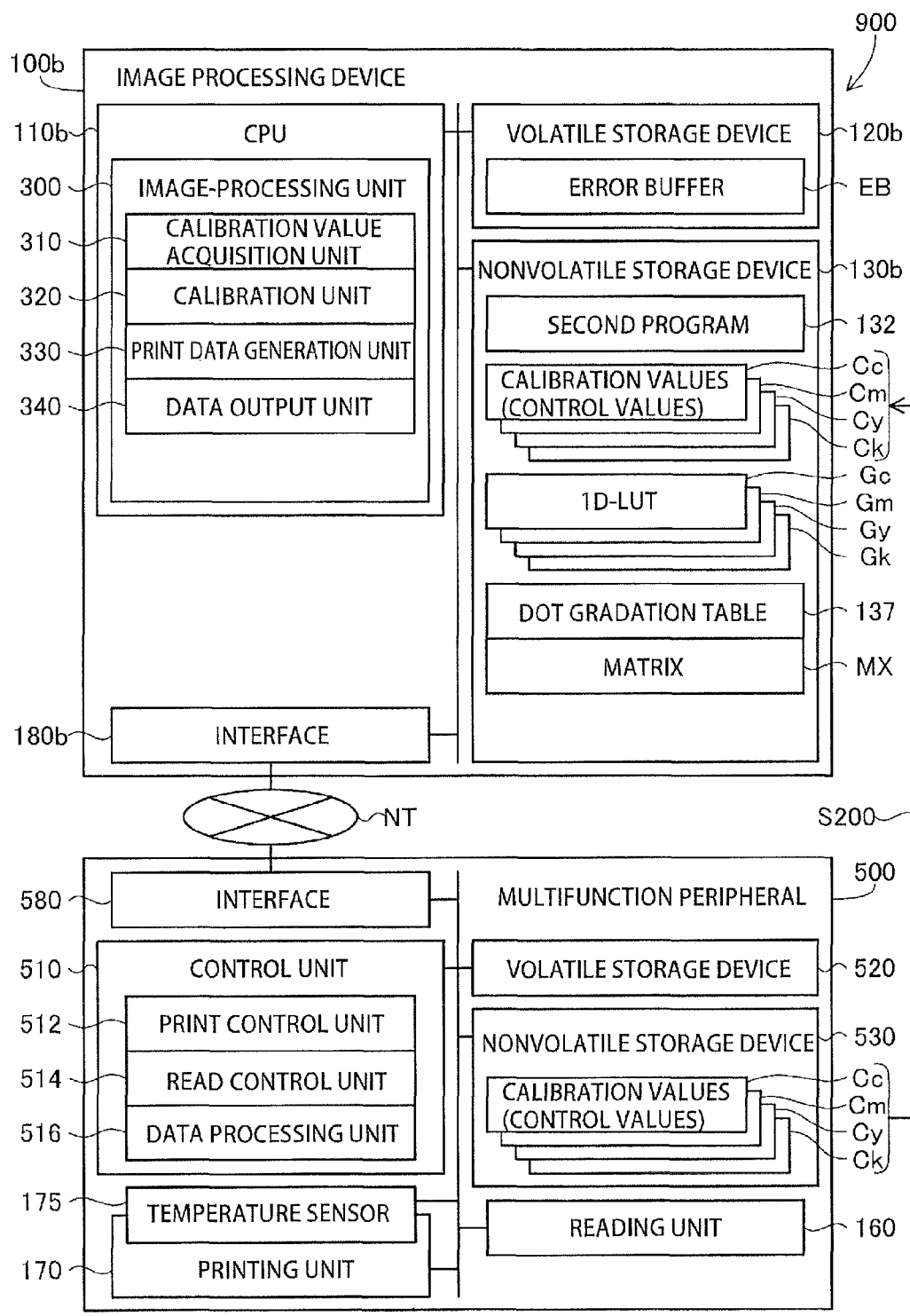
FIG. 17 is a block diagram of an image-processing system according to a fourth embodiment of the present invention.

FIG. 17 is a block diagram of an image-processing system 900 according to a fourth embodiment of the present invention. The image-processing system 900 includes a network NT; and an image processor 100b and a multifunction peripheral 500 connected to each other via the network NT. Like parts in components in FIG. 17 to those shown in FIG. 1 are designated with the same reference numerals to avoid duplicating description.

The multifunction peripheral 500 includes a control unit 510, a volatile storage device 520, a nonvolatile storage device 530, the reading unit 160, the printing unit 170, the temperature sensor 175, and an interface 580 for connecting the multifunction peripheral 500 to the network NT.

The calibration values Cc, Cm, Cy, and Ck are pre-stored in the nonvolatile storage device 530 (in the factory prior to shipping the multifunction peripheral 500, for example). The calibration values Cc, Cm, Cy, and Ck are set to values suited to the printing unit 170 according to the method described in FIGS. 2 and 3 of the first embodiment.

The control unit 510 is a control circuit that performs overall control of the multifunction peripheral 500, such as an application-specific integrated circuit (ASIC). The control unit 510 includes a print control unit 512, a read control unit 514, and a data process unit 516. The print control unit 512 receives print data through the interface 580 and controls the printing unit 170 to perform a printing operation according to this print data. The read control unit 514 controls the reading unit 160 to generate scan data. The data process unit 516 transmits and receives data via the interface 580.

The image processor 100b is a common computer, for example. The image processor 100b includes a CPU 110b for performing overall control of the image processor 100b, a volatile storage device 120b, a nonvolatile storage device 130b, and an interface 180b for connecting the image processor 100b to the network NT. The nonvolatile storage device 130b serves to store the second program 132; the calibration values Cc, Cm, Cy, and Ck; the mappings Gc, Gm, Gy, and Gk; the dot gradation table 137; and the matrix MX. As will be described later, the calibration values Cc, Cm, Cy, and Ck are acquired from the multifunction peripheral 500, while all other data is pre-stored in the nonvolatile storage device 130b (when the second program 132 is installed, for example).

The CPU 110b executes the second program 132 to function as the image-processing unit 300. As in the embodiments described above, the image-processing unit 300 performs a printing process according to the procedure in FIG. 7. However, steps S200 and S260 are modified as will be described below, while S290 is omitted from the printing process. The multifunction peripheral 500 executes a process equivalent to that in S290.

In S200 the calibration value acquisition unit 310 acquires the calibration values Cc, Cm, Cy, and Ck from the multifunction peripheral 500. Specifically, the calibration value acquisition unit 310 sends a request to the multifunction peripheral 500 and, upon receiving this request, the data process unit 516 of the multifunction peripheral 500 returns the calibration values Cc, Cm, Cy, and Ck to the image processor 100b. The calibration value acquisition unit 310 stores the calibration values Cc, Cm, Cy, and Ck in the nonvolatile storage device 130b. Once the calibration value acquisition unit 310 has stored in the calibration values Cc, Cm, Cy, and Ck in the nonvolatile storage device 130b, the process of S200 is skipped in subsequent printing processes.

In S260 the data output unit 340 outputs the print data to the multifunction peripheral 500, thereby ending the process on the image processor 100b side. Thereafter, the print control unit 512 of the multifunction peripheral 500 performs a printing operation based on the print data received from the image processor 100b.

As described above, a separate external device (the image processor 100b in this case) that is connected to a device possessing the printing unit 170 (the multifunction peripheral 500 in this case) can generate print data based on the calibration values Cc, Cm, Cy, and Ck.

E. Fifth Embodiment

FIG. 18 is a block diagram of an image-processing system 910 according to a fifth embodiment of the present invention. The image-processing system 910 includes the network NT; and a control unit 100e and the multifunction peripheral 500 that are connected to each other via the network NT. The multifunction peripheral 500 is identical to that in FIG. 17. Like parts and components in FIG. 18 to those in FIGS. 1 and 17 are designated with the same reference numerals to avoid duplicating description.

The control unit 100c is a common computer, for example, and includes a CPU 110c for performing overall control of the control unit 100c, a volatile storage device 120c, a nonvolatile storage device 130c, and an interface 180c for connecting the control unit 100c to the network NT. The nonvolatile storage device 130c stores the first program 131, offset table 134, calibration table 136, calibration values Cc, Cm, Cy, and Ck, and temperature adjustment data 138. As will be described later, the control unit 100c generates the calibration values Cc, Cm, Cy, and Ck, while all other data is pre-stored in the nonvolatile storage device 130c (when the first program 131 is installed, for example).

By executing the first program 131, the CPU 110c functions as the control-processing unit 200. As described in previous embodiments, the control-processing unit 200 sets the calibration values Cc, Cm, Cy, and Ck according to the procedure in FIG. 2. However, steps S100-S107 and S150 are modified as described below.

In S100 the color patch output unit 240 issues a request to the multifunction peripheral 500 for temperature data. In response to this request, the data process unit 516 of the multifunction peripheral 500 acquires data representing temperature from the temperature sensor 175 and returns the acquired data to the control unit 100c. The color patch output unit 240 generates print data representing the color patch set CP using the data received from the multifunction peripheral 500, and outputs the print data to the multifunction peripheral 500. The print control unit 512 of the multifunction peripheral 500 then prints the color patch set CP based on the print data received from the control unit 100c.

In S105 the measurement value acquisition unit 210 outputs a command to the multifunction peripheral 500, instructing the multifunction peripheral 500 to control the reading unit 160 to scan the color patch set CP. In the meantime, the user sets the color patch set CP in the reading unit 160. Next, the measurement value acquisition unit 210 outputs a command to the multifunction peripheral 500 to begin scanning based on a user command. The read control unit 514 of the multifunction peripheral 500 begins scanning the color patch set CP in response to the command received from the control unit 100c, generating scan data. In S107 the measurement value acquisition unit 210 acquires this scan data from the multifunction peripheral 500 (reading unit 160).

In S150 the second setting unit 230 outputs calibration values set in S145 to the multifunction peripheral 500. The data process unit 516 of the multifunction peripheral 500 stores the calibration values in the nonvolatile storage device 530. Thereafter, the control unit 100c can use the calibration values stored in the nonvolatile storage device 530 as in the fourth embodiment described in FIG. 17.

As described above, a separate external device (the control unit 100c in this case) connected to a device possessing the printing unit 170 (the multifunction peripheral 500 in this case) may set the calibration values Cc, Cm, Cy, and Ck. Further, the color patch set CP may be scanned by a reading unit provided in a separate device from the device possessing the printing unit 170 (the multifunction peripheral 500 in this case). In this case as well, the measurement value acquisition unit 210 can acquire scan data from the reading unit that reads the color patch set CP.

F. Variations of the Embodiments

While the invention has been described in detail with reference to the first through fifth embodiments thereof, it would be apparent to those skilled in the art that various changes and modifications may be made therein without departing from the spirit of the invention.

(1) The offsets set by the first setting unit 220 (the process offsets Vga and Vba) are not limited to those values described with reference to FIG. 4, but may be any of various values representing offsets between scan values and reference scan values. In any case, it is preferable that the offset set according to scan values can achieve calibration suited to various ink ejection amounts. It is also desirable to set correlations between scan values and offsets (hereinafter called "scan-offset relationships") that can facilitate setting calibration values for achieving such calibration. These scan-offset relationships can be modified in various ways depending on the characteristics of the printing unit 170 and the characteristics of the reading unit that reads the color patches. For example, it is also conceivable to have offsets that are nonlinear in relation to the difference ratio. In any case the scan-offset relationships can be set based on experiments for evaluating correlations between various ink ejection amounts and scan values obtained from patches printed at these ink ejection amounts. Scan-offset relationships set in this way are very likely to have characteristics described using the scan value pairs SP1 and SP2 of FIG. 4. In other words, employing scan-offset relationships having such characteristics can facilitate calibrations suitable to various ink ejection amounts. However, it is also feasible to employ scan-offset relationships that do not possess these characteristics. Further, the first setting unit 220 may set temperature-calibrated offsets using the temperature Tp.

(2) Various values may be targeted for calibration with calibration values. In the embodiments described above, values related to the halftone process (the dot gradation values described in S215 of FIG. 7 and the input values described in S240) and parameters used in color conversion (the output values of density conversion correlations described in S210 of FIG. 7) are calibrated using calibration values. However, any one or two values from among these three candidates may serve as the targets of calibration. In such cases, the processes for calibrating the value or values not selected (one or two of the processes in S210, S215, and S240 of FIG. 7) may be omitted. Other values may also serve as targets of calibration. For example, correlations between RGB and CMYK values (output color values) used in S232 of FIG. 7 may be targeted for calibration. Additionally, the halftone process may be one that uses a dither matrix. In this case, the threshold values defined by the dither matrix may be targets of calibration.

(3) It is also possible to have a plurality of dot ink quantity configurations for defining correlations between a plurality of dot sizes and prescribed dot ink quantities for each dot size. A dot ink quantity configuration may be set from among the plurality of configurations based on a user-specified type of printing medium and printing resolution. In this case, the process for setting calibration values and the process for performing calibration with these values are preferably performed independently for each dot ink quantity configuration. In this way, it is possible to perform suitable calibration for each dot ink quantity configuration when there is a plurality of configurations. For example, it is preferable to prepare an offset table 134 shown in FIG. 4, a calibration table 136 shown in FIG. 6, mappings Gc, Gm, Gy, and Gk in FIG. 8 (in particular, correlations for a calibration value of "1"), and correlations between RGB and CMYK values used in S232 of FIG. 7 for each dot ink quantity configuration.

(4) Ink used for printing is not limited to cyan, magenta, yellow, and black ink, but may be ink of any number, any type, and any composition (particular the color composition). For example, the printing unit may employ two types of ink, such as water-based ink and oil-based ink. When using a plurality of ink types, a first offset is preferably set using a first scan value obtained from patches formed in the first ink type, and calibration values (control values) are preferably set for the first ink type based on the first offset. Further, a second offset is preferably set using second scan values obtained from patches formed with the second ink type, and calibration values for the second ink type are preferably set based on the second offset. Next, calibration-target values associated with the first ink type are preferably calibrated using the calibration values for the first ink type, while calibration target values associated with the second ink type are preferably calibrated using the calibration values for the second ink type. Generally, it is preferable to set calibration values independently for each ink type using patches formed for each of the plurality of ink types used for printing. However, it is also possible to set calibration values for all ink types using patches formed with a single ink type.

(5) The total number of dot sizes used in printing is arbitrary and not limited to three. For example, the four dot sizes "small dot," "medium dot," "large dot," and "extra-large dot" may be used, or a single dot size may be used.

When using a plurality of dot sizes, the first offset is preferably set using first scan values obtained from patches printed with dots at the first size, and calibration values for the first size are preferably set based on this first offset. Further, a second offset is preferably set using second scan values obtained from patches printed with dots at the second size, and calibration values for the second size are preferably set based on this second offset. Alternatively, calibration values may be set for all dot sizes using patches formed in only one of the dot sizes available for printing.

(6) Instead of recording data representing temperature (the barcode BC in FIG. 3, for example) in the color patch set CP in the embodiments shown in FIGS. 1 and 18, the second setting unit 230 may acquire data representing temperature from the temperature sensor 175 when printing the color patch set CP (S100 of FIG. 2). Subsequently, in S140 of FIG. 2, the second setting unit 230 could adjust the process offsets using the acquired temperature.

(7) The printing unit 170 of the embodiments is not limited to an inkjet printer, but may be another type of printer such as a laser printer that employs toner as colorant.

(8) The functions of the control-processing unit 200 may be shared among a plurality of devices (computers, for example) capable of communicating over a network so that the devices as a whole can provide the functions of the control-processing unit 200 (here, the system comprising the devices corresponds to the control unit). Similarly, the functions of the image-processing unit 300 may be shared among a plurality of devices (computers, for example) capable of communicating over a network so that the devices as a whole can provide the functions of the image-processing unit 300 (here, the system comprising the devices corresponds to the image processor).

Part of the configuration implemented in hardware in the embodiments may be replaced with software and, conversely, all or part of the configuration implemented in software in the embodiments may be replaced with hardware. For example, the functions of the control-processing unit 200 in FIG. 1 may be implemented by dedicated hardware configured of logic circuits.

When all or part of the functions of the present invention are implemented with computer programs, the programs can be stored on a computer-readable storage medium (a non-temporary storage medium, for example). The programs may be used on the same storage medium on which they were supplied or transferred to a different storage medium (computer-readable storage medium). The "computer-readable storage medium" may be a portable storage medium, such as a memory card or CD-ROM; an internal storage device built into the computer, such as any of various ROM or the like; or an external storage device, such as a hard disk drive, connected to the computer.

What is claimed is:

1. A non-transitory computer readable storage medium storing a set of program instructions installed on and executed by a computer, the program instructions, when executed, cause the computer to perform a method comprising:
    determining a single offset value based on a plurality of offsets of measurement values acquired from a plurality of test images printed with a first color;
    acquiring a calibration value based on a plurality of test images that are printed on a recording medium, the calibration value indicating an amount of calibration, wherein acquiring the calibration value includes determining a single calibration value for the first color corresponding to the single offset value;
    calibrating, by using the calibration value, a conversion correlation between each of a plurality of input values and each of a plurality of output values, the calibrated conversion correlation being a conversion correlation between each of the plurality of input values and each of a plurality of calibrated output values, the plurality of input values including a part of the plurality of input values which is greater than a predetermined input value, the part of the plurality of input values corresponding to a part of the plurality of calibrated output values which is set to a maximum value;
    performing a color conversion on the image data by using the calibrated conversion correlation; and
    generating print data by performing a halftone process on the converted image data through the color conversion,
    wherein the print data is printed by a colorant representing the first color.

2. The non-transitory computer readable storage medium according to claim 1, wherein the conversion correlation includes a partial conversion correlation between input values smaller than a first predetermined value and output values corresponding to the input values smaller than the first predetermined values;
    wherein the calibrating sets the partial conversion correlation to a predetermined correlation between the input values smaller than the first predetermined value and output values corresponding to the input values smaller than a first predetermined value.

3. The non-transitory computer readable storage medium according to claim 1, wherein the conversion correlation includes a partial conversion correlation between: input values that are greater than a first predetermined value and smaller than a second predetermined value; and output values corresponding to the input values smaller than the first predetermined value and smaller than the second predetermined value, the output values including a first output value corresponding to the first predetermined value, and a second output value corresponding to the second predetermined value;
    wherein the calibrating calibrates the partial conversion correlation such that the output value increases continuously from the first output value to the second output value when the input value increases from the first predetermined value to the second predetermined value.

4. The non-transitory computer readable storage medium according to claim 1, wherein the calibrating further calibrates, by using the calibration value which is used by calibrating the conversion correlation, at least a parameter value used in the halftone process and an input value used in the halftone process.

5. The non-transitory computer readable storage medium according to claim 4, wherein the calibrating further calibrates, by using the calibration value which is used by calibrating the conversion correlation, both the parameter value used in the halftone process and the input value used in the halftone process.

6. An image processing device comprising:
    a processor; and
    the non-transitory computer readable storage medium according to claim 1.

7. A non-transitory computer readable storage medium storing a set of program instructions installed on and executed by a computer, the program instructions comprising:

determining a single offset value based on a plurality of offsets of measurement values acquired from a plurality of test images printed with a first color;

acquiring a calibration value based on a plurality of test images that are printed on a recording medium, the calibration value indicating an amount of calibration, wherein acquiring the calibration value includes determining a single calibration value for the first color corresponding to the single offset value;

calibrating, by using the calibration value, a dot gradation value of a target pixel used in a halftone process, the dot gradation value being used to determine a dot formation state of each pixel of an image in the halftone process, the image including a plurality of pixels including the target pixel and neighboring pixels around the target pixel, each of the plurality of pixels having a gradation value;

performing the halftone process, the halftone process including:

determining, as a dot formation state of the target pixel, one of a plurality of dot formation states using the gradation value of the target pixel and a first error value that has been acquired from the neighboring pixels; and determining a second error value using the dot gradation value corresponding to the determined dot formation state; and generating print data by performing the halftone process on each pixel using the calibrated dot gradation values, wherein the print data is printed by a colorant representing the first color.

8. The non-transitory computer readable storage medium according to claim 7, wherein the program instructions further comprise outputting the print data to a printing unit, wherein the test images are printed by the printing unit.

9. The non-transitory computer readable storage medium according to claim 7, wherein the plurality of dot formations includes a no-dot state and K number of dot formation states, the no-dot state being a state in which a dot is not formed, each of the K number of dot formation states being a state in which a dot in a corresponding one of K number of different sizes is formed;

wherein the calibrating calibrates a dot gradation value for each of the K number of dot formation states.

10. The non-transitory computer readable storage medium according to claim 7, wherein the dot gradation value corresponding to the maximum size of dot when the calibration value indicates the amount of calibration being zero is set to a value greater than a maximum value within a range of input values that are capable of being processed in the halftone process.

11. The non-transitory computer readable storage medium according to claim 7, wherein the acquiring acquires the calibration value based on read values acquired by reading the plurality of test images optically.

12. An image processing device comprising:
a processor; and
the non-transitory computer readable storage medium according to claim 7.

13. The image processing device according to claim 12, further comprising a reading unit configured to read optically the plurality of test images.

14. A non-transitory computer readable storage medium storing a set of program instructions installed on and executed by a computer, the program instructions comprising:

acquiring a calibration value based on a plurality of test images that are printed on a recording medium, the calibration value indicating an amount of calibration;

wherein the program instructions further comprising at least one of:

calibrating a target value by using the calibration value, the target value being used to determine a dot formation state of each pixel of an image in a halftone process; and generating print data by performing the halftone process on each pixel using the calibrated target value; and calibrating a target value by using the calibration value, the target value being a parameter used to perform a color conversion on image data; performing the color conversion on the image data by using the calibrated target value; and generating print data by performing a halftone process on the converted image data through the color conversion;

wherein the print data is printed by a plurality of colorants including a first colorant, a black colorant, and a second colorant, the first colorant representing a first color different from a black color, the black colorant representing a black color, the second colorant representing a second color different from the first color and the black color;

wherein the target value includes a first target value relating to the first colorant, a black target value relating to the black colorant, and a second target value relating to the second colorant;

wherein the acquiring acquires a first calibration value for the first colorant and the second colorant and acquires a black calibration value for the black colorant; and wherein the calibrating calibrates the first target value by using the first calibration value, calibrates the black target value by using the black calibration value, and the second target value by using the first calibration value.

15. The non-transitory computer readable storage medium according to claim 14, wherein the black colorant has a type of colorant different from a type of colorant of the first colorant, and wherein the second colorant has a type of colorant same as the type of colorant of the first colorant.

16. The non-transitory computer readable storage medium according to claim 14, wherein the program instructions comprising both:

calibrating a target value by using the calibration value, the target value being used to determine a dot formation state of each pixel of an image in a halftone process; and generating print data by performing the halftone process on each pixel using the calibrated target value; and calibrating a target value by using the calibration value, the target value being a parameter used to perform a color conversion on image data; performing the color conversion on the image data by using the calibrated target value; and generating print data by performing a halftone process on the converted image data through the color conversion.

17. The non-transitory computer readable storage medium according to claim 14, wherein the program instructions, when executed, perform a method that further includes:

for the first calibration value:
determining a single offset value based on a plurality of offsets of measurement values acquired from a plurality of test images printed with the first color; and determining the first calibration value for the first color corresponding to the single offset value; and for the black calibration value:
  determining a single offset value based on a plurality of offsets of measurement values acquired from a plurality of test images printed with the black color; and
  determining the black calibration value for the black color corresponding to the single offset value.

18. An image processing device comprising:
a processor; and
the non-transitory computer readable storage medium according to claim 14.

19. A non-transitory computer readable storage medium storing a set of program instructions installed on and executed by a computer, the program instructions comprising:

acquiring a calibration value based on a plurality of test images that are printed with a first color on a recording medium, the calibration value indicating an amount of calibration;

calibrating, by using the calibration value, an input value used in a halftone process, the input value being used to determine a dot formation state of each pixel of an image in the halftone process; and generating print data by performing the halftone process on each pixel using the calibrated input value, wherein the generating includes determining the input value using color values represented by image data indicative of the image, the determining changes the input value such that a maximum value within a predetermined range of the input values that can be determined by the image processing device is smaller than a prescribed value if the calibration value indicates the amount of calibration being zero, the prescribed value being a maximum value within a range of input values that are capable of being processed in the halftone process, and wherein the print data is printed by a colorant representing the first color.

20. The non-transitory computer readable storage medium according to claim 19, wherein the calibrating adjusts the calibrated input value to a predetermined value if the calibrated input value is greater than the predetermined value.

21. An image processing device comprising:
a processor; and
the non-transitory computer readable storage medium according to claim 19.

* * * * *